(12) United States Patent
Shimizu

(10) Patent No.: US 7,180,612 B2
(45) Date of Patent: Feb. 20, 2007

(54) PRINT SYSTEM, IMAGE PROCESSING APPARATUS AND INFORMATION PROCESSING APPARATUS

(75) Inventor: Masaaki Shimizu, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 816 days.

(21) Appl. No.: 09/922,646

(22) Filed: Aug. 7, 2001

(65) Prior Publication Data

US 2002/0054313 A1 May 9, 2002

(30) Foreign Application Priority Data

Aug. 8, 2000 (JP) .............................. 2000-239556
Jul. 16, 2001 (JP) .............................. 2001-215285

(51) Int. Cl.
*G06F 15/00* (2006.01)
*G06K 15/00* (2006.01)

(52) U.S. Cl. ..................................... 358/1.13; 358/1.15

(58) Field of Classification Search ............... 358/1.13, 358/1.15, 1.16, 1.9
See application file for complete search history.

(56) References Cited

U.S. PATENT DOCUMENTS 5,511,150 A * 4/1996 Beaudet et al. ............ 358/1.14
5,669,040 A * 9/1997 Hisatake ....................... 399/83
5,706,411 A * 1/1998 McCormick et al. ...... 358/1.14
5,727,135 A * 3/1998 Webb et al. ................ 358/1.14
6,130,757 A * 10/2000 Yoshida et al. ............ 358/1.15
6,198,542 B1 * 3/2001 Tabata ....................... 358/1.15
6,421,135 B1 * 7/2002 Fresk et al. ................ 358/1.15
6,501,485 B1 * 12/2002 Dash et al. ................. 715/700
6,504,627 B1 * 1/2003 Matsumoto ................. 358/448
6,618,163 B1 * 9/2003 Roosen et al. ............. 358/1.15
6,785,013 B1 * 8/2004 Ota et al. ................... 358/1.15

FOREIGN PATENT DOCUMENTS

JP          10-124442           1/1989

* cited by examiner

*Primary Examiner*—Gabriel I. Garcia
(74) *Attorney, Agent, or Firm*—Fitzpatrick, Cella, Harper & Scinto

(57) ABSTRACT

At the print request from the information processing apparatus, the functcion status of the functions of the image processing apparatus capable of executing plural functions is displayed on the information processing apparatus.

For this purpose, the printer controller acquires the function status information for the image processing functions and manages in unified manner the acquired information indicating the function status of the image processing functions, and, at the transfer of the print data, the host computer acquires, from the printer controller, and displays the latest information of the function status of the image processing functions at the transfer of the print data.

35 Claims, 19 Drawing Sheets

FIG. 24

MEMORY MAP OF MEM MEDIUM (FD/CD-ROM)

| DIRECTORY |
|---|
| PROGRAM CODES FOR FLOWCHART OF FIG.17 |
| PROGRAM CODES FOR FLOWCHART OF FIG.18 |
| PROGRAM CODES FOR FLOWCHART OF FIG.19 |
| PROGRAM CODES FOR FLOWCHART OF FIG.20 |
| PROGRAM CODES FOR FLOWCHART OF FIG.25 |
| |

PRINT SYSTEM, IMAGE PROCESSING APPARATUS AND INFORMATION PROCESSING APPARATUS

BACKGROUND OF THE INVENTION

1. Field of the Invention

The present invention relates to an image processing apparatus capable of executing one of plural image processing functions, selected according to a print command from an external apparatus or an image processing command from an operation unit, an information processing apparatus to be connected with such image processing apparatus, and a print system composed of such image processing apparatus and information processing apparatus.

2. Related Background Art

The conventional printing apparatus is generally provided with a single function such as a printer (such function being printing function in this case), and there is usually utilized a printing system in which such single-function printing apparatus is connected to a host computer.

In such print system, the printing apparatus and the host computer are connected through a bidirectional interface (for example serial, parallel, USB etc.) to enable monitoring of the status of the printing apparatus on the display image of the host computer, thereby improving convenience of the user.

For example, it is possible to display states of the printing apparatus, such as absence of printing sheets or sheet jamming, on the display of the host computer on real-time basis. It is also possible, even in a network environment, that the network host computer can monitor, on real-time basis, the state of the printing apparatus connected to the network.

SUMMARY OF THE INVENTION

In the print system utilizing the aforementioned single-function printing apparatus, the host computer can monitor the state of the printing apparatus on real-time basis, regardless whether the host computer and the printing apparatus are connected through an interface cable or a network.

However, in case the host computer is connected through an interface cable or a network to the printer function of a multifunction printer (image processing apparatus) in which plural functions such as copying function, facsimile function, printer function etc. commonly utilize a same printer engine, there is encountered a drawback that the host computer can recognize the state of the printing apparatus relating to the printing function but cannot recognize the state of the printing apparatus relating to other functions. For example, in case, while a user is executing a copying operation with the printing apparatus, another user wishes to issue a document print command to the printing apparatus from the host computer, the display of the host computer indicates that the printing apparatus is usable. However, since the printing apparatus is currently occupied by the copying operation, the document printing cannot be executed in response to the issued print command.

In such case, the user believes that the document printing can be executed immediately by looking at the display, but the document printing is in fact executed after the copying operation is completed.

In consideration of the foregoing, a first object of the present invention is to inform the user of the function state of image processing functions operable on the image processing apparatus in response to the print command from the information processing apparatus, and to provide a display image excellent in convenience, enabling the user to recognize the image processing functions including the printing function.

A second object of the present invention is, when the user requests information indicating the latest function state of the image processing functions to the image processing apparatus and issues the print command prior to the transfer of the generated print data, to clearly indicate to the user the function state of the image processing functions of the entire image processing apparatus, including those other than the printing apparatus, thereby enabling to recognize the function state of all the image processing functions in the image processing apparatus capable of multifunction processing.

BRIEF DESCRIPTION OF THE DRAWINGS

FIG. 24 is a view showing the memory map of a memory medium storing various data processing programs.

DETAILED DESCRIPTION OF THE PREFERRED EMBODIMENTS

[First Embodiment]

Figure 1:
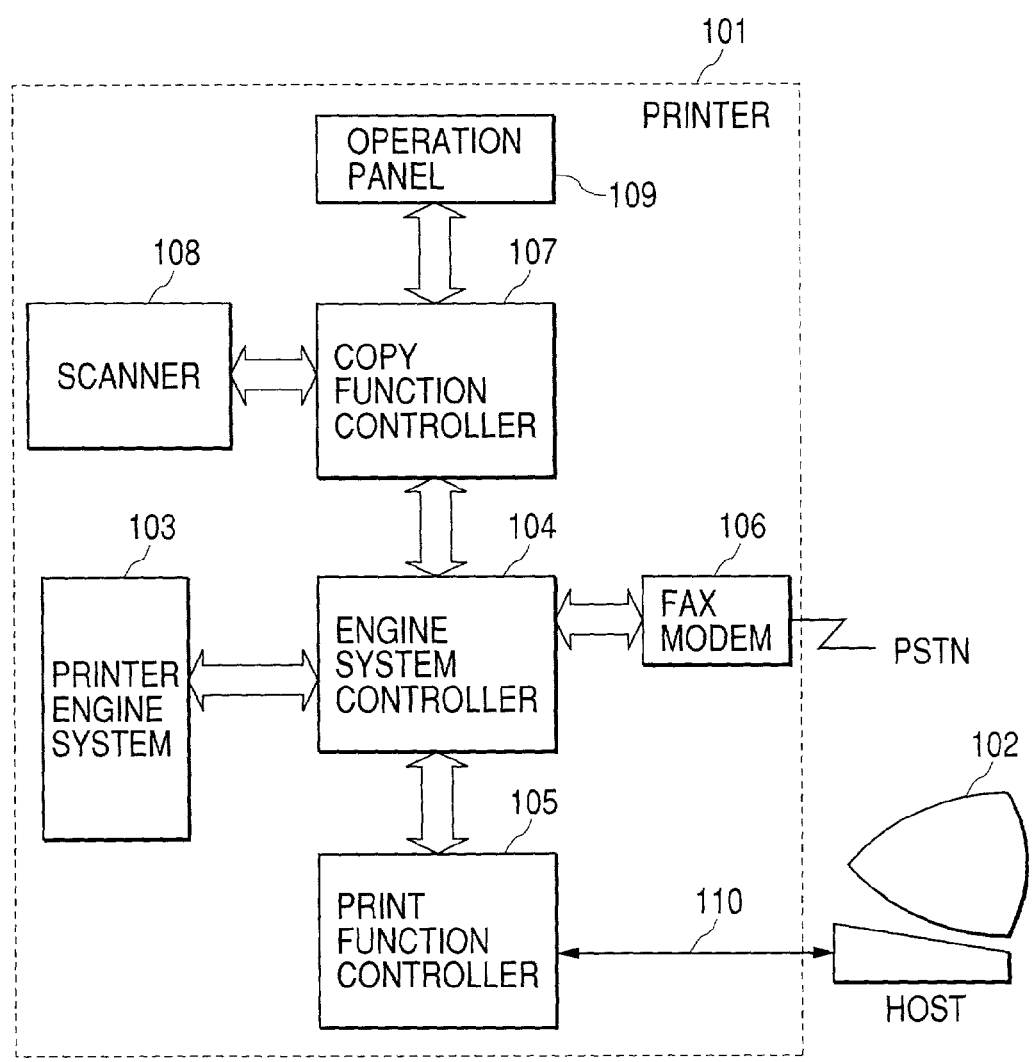
FIG. 1 is a schematic block diagram showing an example of a print system.

FIG. 1 is a schematic block diagram of a print system constituting a first embodiment of the present invention.

Referring to FIG. 1, a printing apparatus (image processing apparatus) 101 is rendered capable of communication with a host computer 102. In the present embodiment, the printing apparatus 101 is provided with multiple functions, namely a copying function, a facsimile functiion and a printer function (the apparatus being called multifunction printer).

A printer engine system (printing mechanism unit) 103 is composed of a printing mechanism for controlling the printing, and a control mechanism for controlling sheet conveying (sheet feeding mode, sheet discharging etc.) in the printer engine. Also the printer engine system 103 transfers the print data (ordinarily video data) onto a sheet in the unit of a page and outputs the printed sheet onto a discharge trays through a fixing unit according to an instruction from an engine system controller 104 to be explained later.

The engine system controller 104 controlls the printer engine system 103. More specifically the engine system controller 104 designates a sheet feeding port and a sheet discharging port and transfers the actual print data (ordinarily video data) to the printer engine system 103 and monitors the state (such as absence of recording sheet or sheet jamming) thereof.

The engine system controller 104 also provides the facsimile function. For this purpose, it is connected to a public network through a fax modem 106. The engine system controller 104 is further connected to a copy function controller 107 and a print function controller 105 to be explained later, which request a print output process to the printer engine system 103 therough the engine system controller 104.

As a result, the print engine controller 104 executes unified control of the state of the printer engine system 103, print function, copy function and fax function, and sends, through the print function controller 105, the status information of the entire printing apparatus to the host computer 102.

A print function controller 105 is connected to the host computer 102 through a bidirectional interface 110 or a network. It receives various print commands from the host computer 102, converts the received print command into a print command matching the interface specification of the printer engine system 103 or the engine system controller 104, and transfers the converted print command to the printer engine system 103 through the engine system controller 104, thereby executing the print process requested from the host computer, thus achieving the print function.

Also the print function controller 105 receives, from the engine system controller 104, the status information of the printing apparatus uniquely monitored by the engine system controller 104, and generates printing apparatus status information (FIG. 7) based on such status information, and transfers the generated printing apparatus status information (also called print status information) to the host computer 102 through the bidirectional interface 110 or the network.

A copy function controller 107 reads original image data of an original by controlling a scanner 108, then converts the read originla image data into data matching the interface specification of the printer engine system 103 or the engine system controller 104, and transfers the converted data to the printer engine system 103 through the engine system controller 104 thereby executing the copying process. Such functions constitute the copy function.

An operation panel 109 serves as a user operation unit to be used in executing the copy function. The user designates the size of the copying sheet and the number of copies and instructs the start of copying operation through the operation panel 109. The operation panel 109 is also used as a data transmission operation unit for the fax function. The user enters the telephone number of the destination and instructs the start of the transmission, through the operation panel 109. The above-mentioned components 103 to 109 constitute a function executing unit in the printing apparatus 101.

Figure 2:
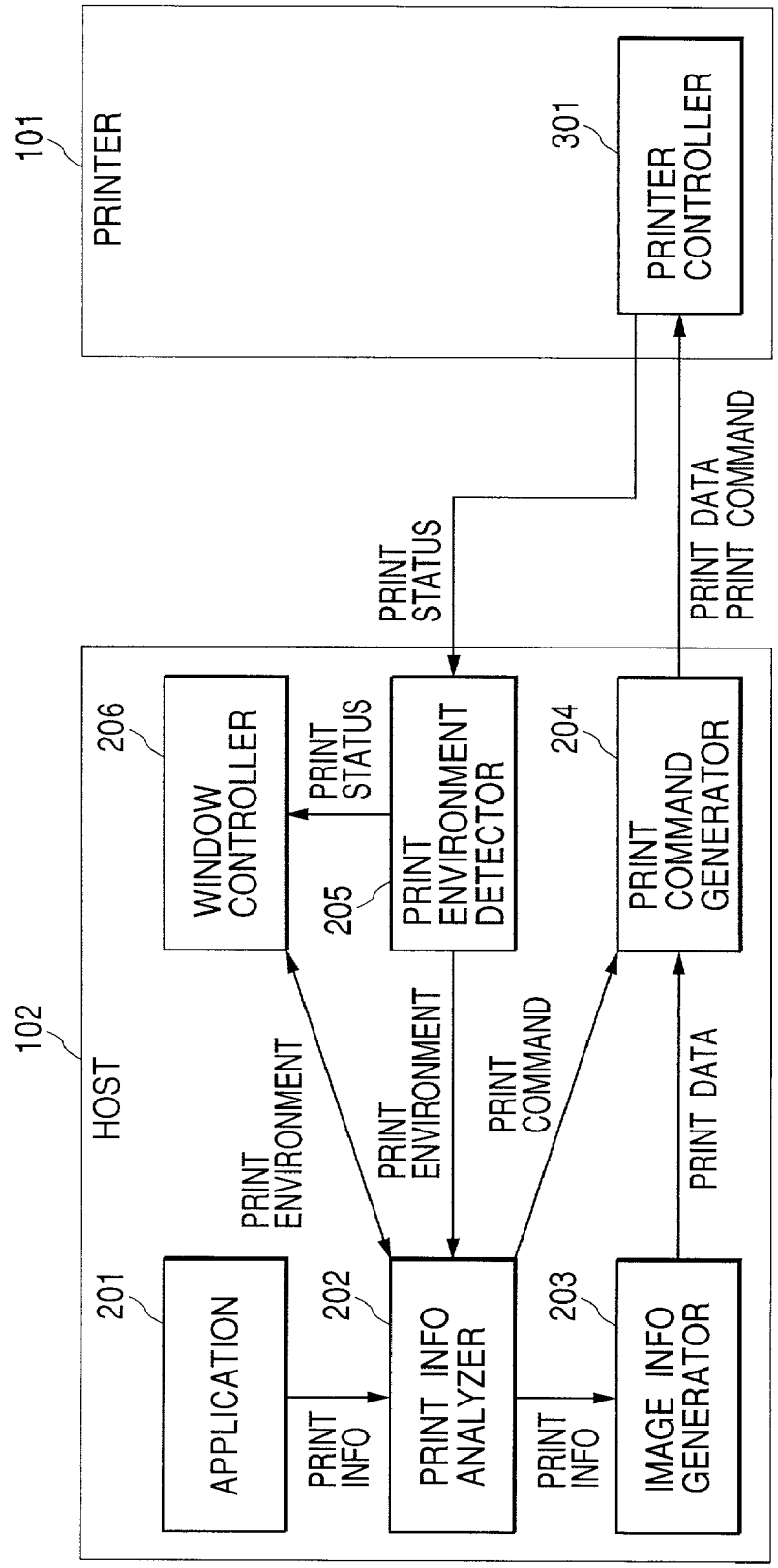
FIG. 2 is a block diagram showing the data processing configuration of a host computer.

FIG. 2 is a block diagram showing the data processing configuration of the host computer 102 shown in FIG. 1, wherein components same as those in FIG. 1 are represented by same numbers. In the following there will be explained the configuration and function of the host computer 102. Components may be realized by hardwares but they may also be realized by the execution of modules contained in a host program by a CPU of the host computer. For example a print information analyzer functions by the execution of a print information analyzing module by the CPU of the host computer 102.

Simultaneous with the activation of the host computer 102, there are activated a print information analyzer (print information analyzing module) 202, a print command generator (print command generating module) 204 and a print environment detector (print environment detecting module) 205.

A window controller (display control module) 206 displays, through the display image of the host computer 102, the status of the printing apparatus 101 and the setting image to be used by the user for setting the printing environment to the printing apparatus 101.

The print command generator 204 periodically transmits, to the printer controller 301 (corresponding to the print function controller 105 shown in FIG. 1) of the printing apparatus 101, a command for acquiring the print status information. The print status information of the printing apparatus 101 is transmitted to the host computer 102 through the printer controller 301.

Then the print environment detector 205 in the host computer 102 informs the reception of the print status information transmitted from the printing apparatus 101. In the present embodiment, the host computer 102 acquires information by palling to the printing apparatus 101, but such form is not restrictive and it is also possible that the printing apparatus 101 itself transmits the print status information to the host computer 102 by trapping when the status of the printing apparatus 101 changes and the print environment detector 205 of the host computer 102 informs reception of the print status information transmitted from the printing apparatus 101.

Figure 4:
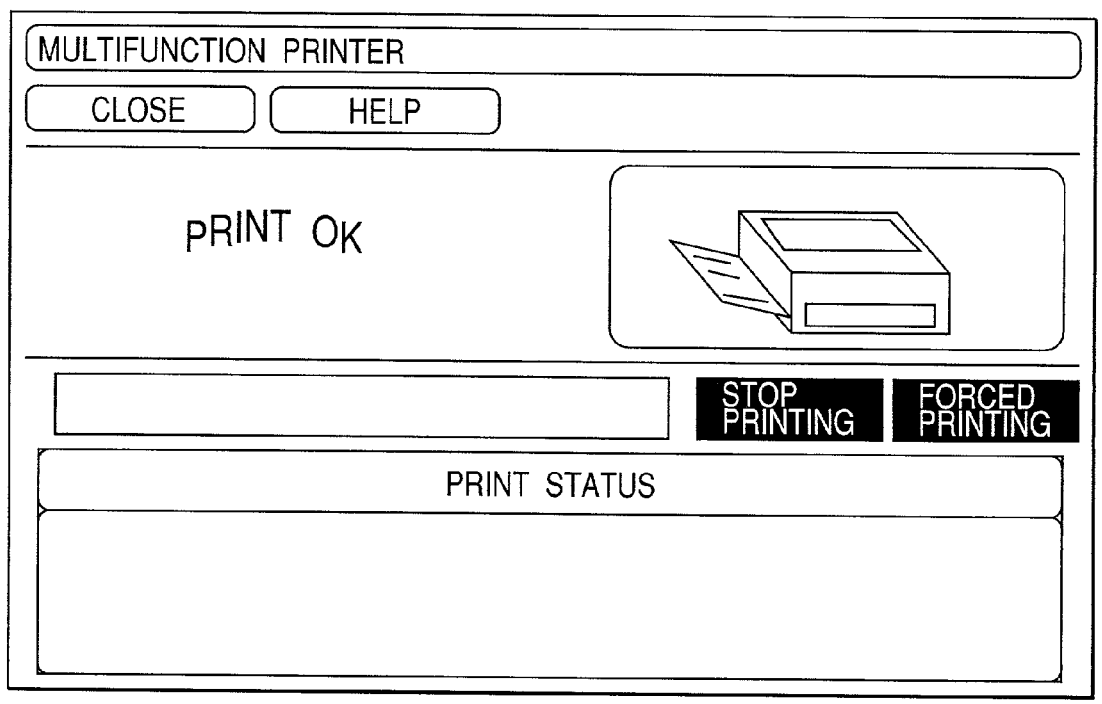
FIG. 4 is a view showing an example of a display image showing the state of a multifunction printer, displayed on a display unit of the host computer.

Based on the print status information transmitted from the printing apparatus 101, the window controller 206 displays the status of the printing apparatus 101 in a format (status window of the printing apparatus 101) as shown in FIG. 4 on the display image of the host computer 102. More specifically, the window controller 206 is controlled by the CPU of the host computer 102, based on a display control module (stored in a ROM of the host computer 102 or an external memory) contained in the host program of the present invention.

The display control module analyzes the print status information transmitted from the printing apparatus 101 and generates a display function for displaying UI (user interface) representing the content of the print status information for supply to the OS (operating system). The OS converts the display function into device-dependent display data interpretable by a display driver (not shown) and sends the dispolay data to the display driver. Based on such display data, the display driver develops a display image in a video memory for display and causes the display unit to display the developed image. Thus the status of the printing apparatus 101 is displayed on the display of the host computer 102 as shown in FIG. 4.

In the following there will be explained the print output process from the host computer 102.

When the user instructs the print output in the course of execution of any application program 201, the application program 201 issues print information (GDI (graphic device interface) function). The OS (not shown) converts the print information, issued by the application program 201, into print information (DDI (device driver interface) function) dependent on the device driver and transmits thus converted print information to the print information analyzer 202.

The print information analyzer 202 analyzes the print information outputted from the application program 201 through the OS and outputs the image information to an image information generator 203. The print information means data such as character codes, patterns or image data for executing the actual print process and print data for designating the position, size etc.

The image information generator (image information generating module) 203 converts the image information, received from the print information analyzer 202, into print data described in a page description language. Also, in synchronization with the print start command of the print command generator 204 (issued by the CPU based on the print command generating module), it transfers the print data to the printing apparatus 101 through the interface cable.

In synchronization with the transfer of the print data, the window controller 206 transmits the information of each print environment, designated on the image, to the print information analyzer 202.

Also the print information analyzer 202 generates a print command from the designated print environment information and transmits it to the print command generator 204, which in response transmits the print command to the printing apparatus 101 through the interface cable.

Figure 3:
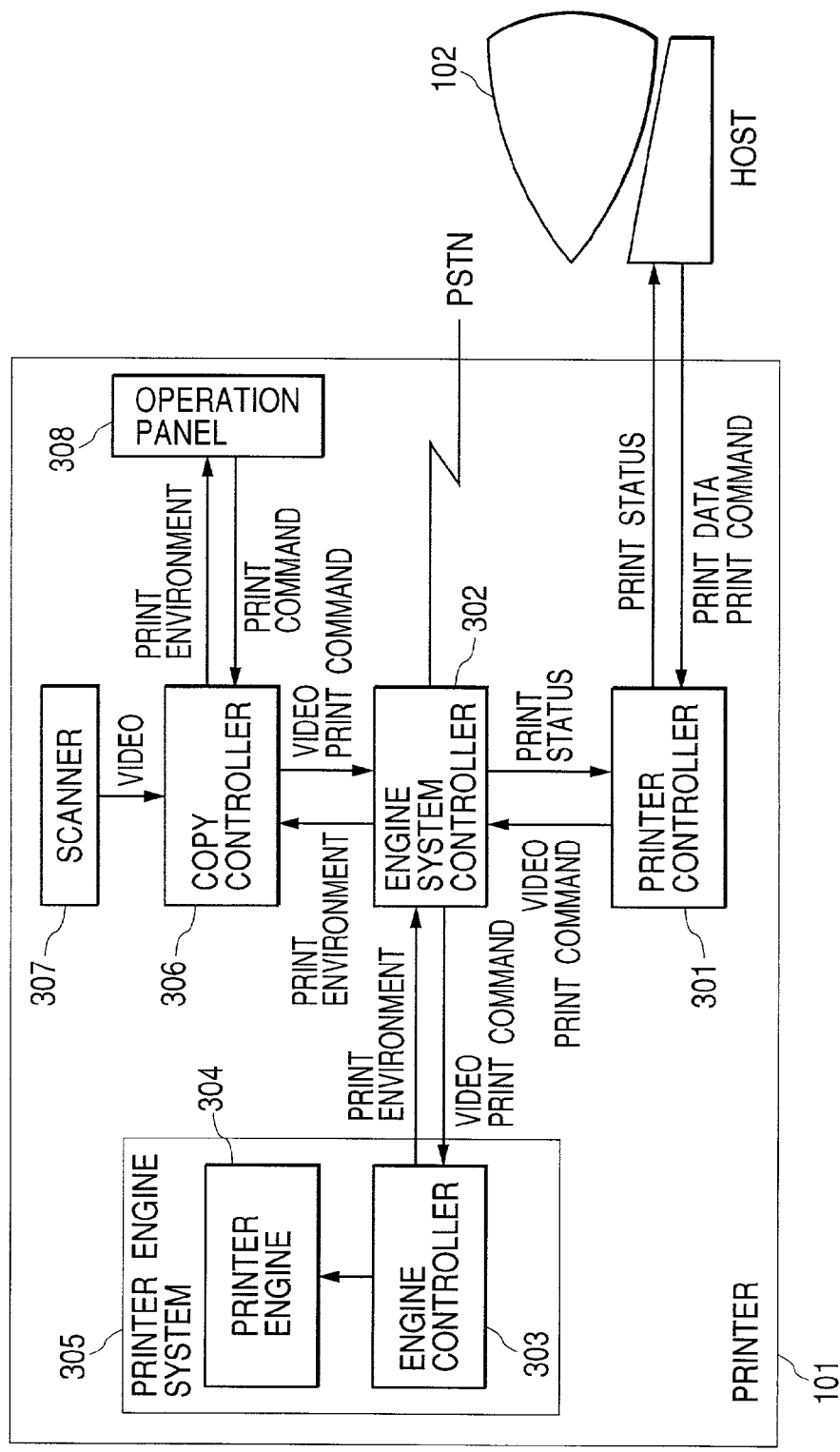
FIG. 3 is a block diagram showing the detailed configuration of a printing apparatus.

The print environment means control data for the printer engine for executing the actual print process, and such control data mean, for example, data for switching the sheet feeding mode (cassette sheet feeding, manual sheet feeding etc.), sheet size etc. FIG. 3 is a block diagram showing the detailed configuration of the printing apparatus 101 shown in FIG. 1, wherein components same as those in FIG. 1 are represented by same numbers.

In FIG. 3, a printer controller 301 corresponds to the print function control unit 105 shown in FIG. 1. An engine system controller 302 (corresponding to the engine system controller 104 shown in FIG. 1) executes central control in the printing apparatus 101. The engine system controller 302 also transfers the print command and video signal to a printer engine system 305 (corresponding to the printer engine system 103 shown in FIG. 1) in the printing apparatus 101, and receives the status information of the printer engine system 305. The status information indicates whether the printer engine system 305 is functioning properly or the absence of sheet or sheet jamming therein.

Also the engine system controller 302 exchanges various information with the printer controller 301 or a copy controller 306 (corresponding to the copy function controller 107 shown in FIG. 1). The engine system controller 302 further executes the fax function.

As a result, the engine system controller 302 can unifiedly monitor or hold the information (status of printing apparatus) on the printer engine system 305, printer controller 301, copy controller 306 and fax function.

The print command transmitted from the print command generator 204 in the host computer 102 is converted in the printer controller 301 (corresponding to the print function controller 105 shown in FIG. 1) so as to match the specification of the engine system controller 302 (corresponding to the engine system controller 104 shown in FIG. 1) and is transmitted to the engine system controller 302.

The engine system controller 302 executes a process corresponding to the print command from the printer controller 301 and returns the result of the process to the printer controller 301.

In the present embodiment, when an acquisition command for the printing apparatus status information is transferred from the print command generator 204 in the host computer 102 to the printer controller 301, the printer controller 301 transfers such status information acquisition command to the engine controller 302.

In response to the acquisition command for the status information, the engine system controller 302 returns the status information, indicating the state of the printing apparatus and unifiedly held in the engine system controller 302, to the printer controller 301.

In response, the printer controller 301 returns the print status information to the host computer 102, which displays the status of the printing apparatus 101 on the display image of the host computer 102 in the format shown in FIG. 4 (status window of the printing apparatus), as already explained in relation to FIG. 2. An engine controller 303 controls a printer engine 304 for executing the actual print process. The printer engine system 305 (corresponding to the printer engine system 103 shown in FIG. 1) is composed of the engine controller 303 and the printer engine 304.

A copy controller 306 (corresponding to the copy function controller 107 shown in FIG. 1) controls the copy function in the printing apparatus 101 and is connected with the printer engine system 305 through the engine system controller 302. The copy controller 306 also controls a scanner 307 (corresponding to the scanner 108 shown in FIG. 1) and an operation panel 308 (corresponding to the operation panel 109 shown in FIG. 1).

FIG. 4 shows an image displayed on the display device of the host computer 102 shown in FIG. 1. The displayed image indicates the state of the multifunction printer and the content of display is controlled by the window controller 206. The illustrated example shows that the printing apparatus in an idle state.

Figure 5:
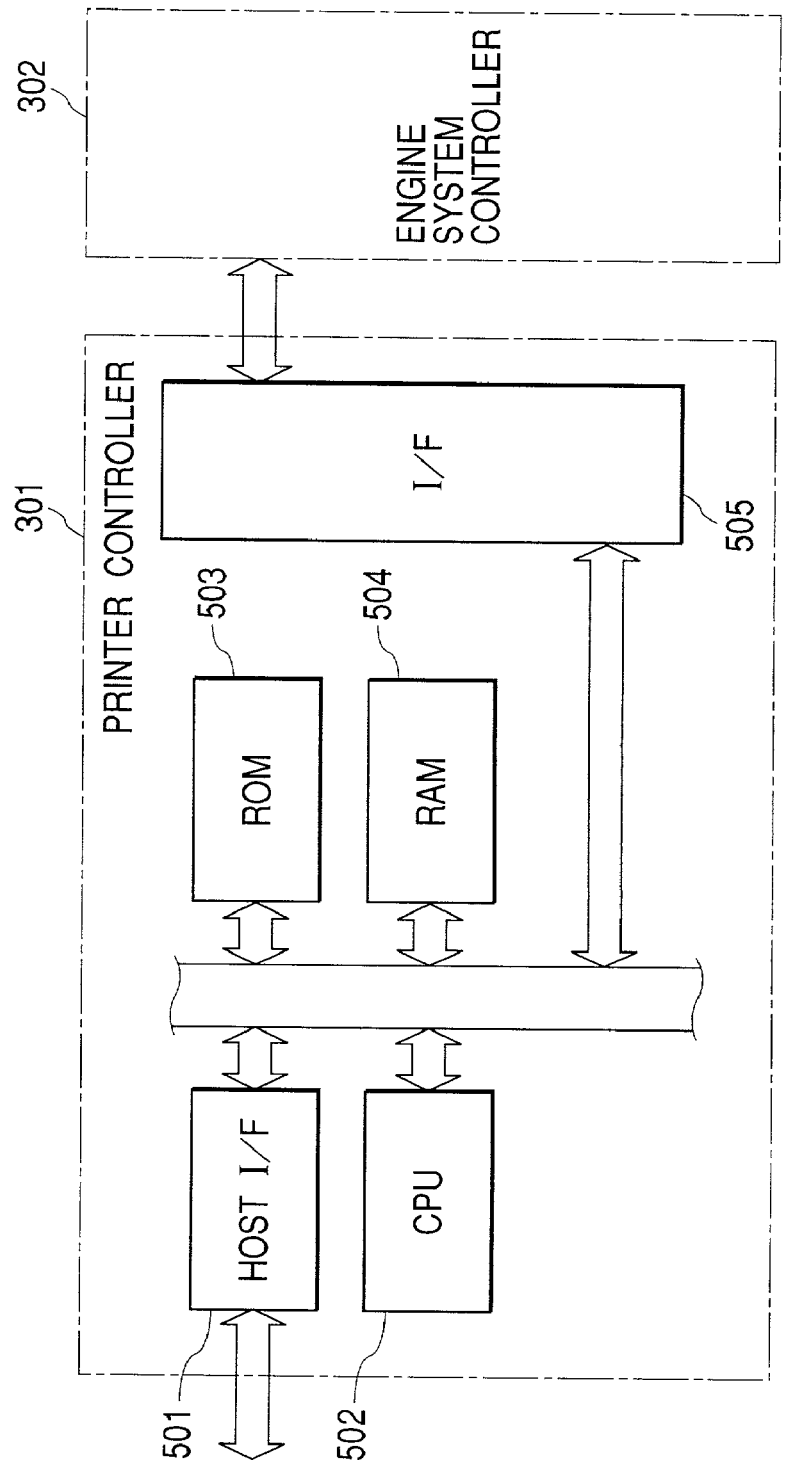
FIG. 5 is a block diagram showing the detailed configuration of a printer controller.

FIG. 5 is a block diagram showing the detailed configuration of the printer controller 301 shown in FIG. 3, wherein components same as those in FIG. 3 are represented by same numbers.

In FIG. 5, there are shown a host interface circuit 501 for executing signal input/output process for the host computer 102, a central processing unit (CPU) 502 for controlling the entire printer controller 301, and a memory (ROM) 503 storing a control program to be executed by the CPU 302 and font data.

A random access memory (RAM) 504 is used for storing information necessary in the execution of the control program stored in the ROM 503, such as the print data or the print command transmitted from the host computer 102 or the print status information transmitted from the engine system controller 302.

An interface circuit 505 functions as an input/output unit for the engine system controller 302.

When for example the print command is transmitted from the host computer 102 and through the host interface circuit 501, the control program of the printer controller 301 once stores the print command in the RAM 504. The control program of the printer controller 301 converts the print command so as to match the specification of the engine system controller 302 and transmits the converted print command to the engine system controller 302 through the interface circuit 505.

Figure 6:
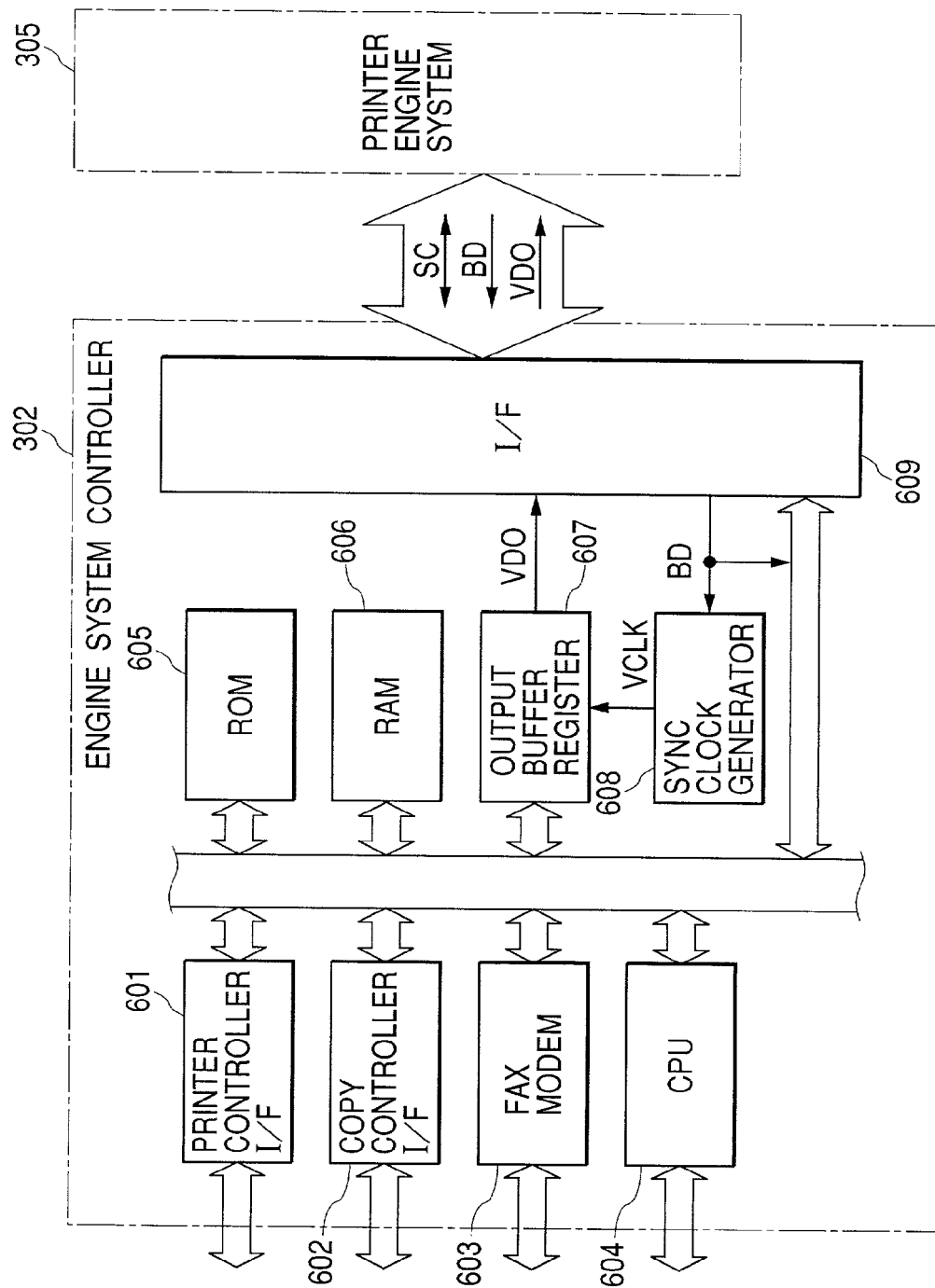
FIG. 6 is a block diagram showing the detailed configuration of a printer engine controller.

FIG. 6 is a block diagram showing the detailed configuration of the engine system controller 302 shown in FIG. 3, wherein components same as those in FIG. 3 are represented by same numbers.

In FIG. 6, a printer controller interface circuit 601 functions as an input/output unit for the printer controller 301. A copy controller interface circuit 602 functions as an input/output unit for the copy controller 306.

A fax modem 603 (corresponding to the fax modem 106 shown in FIG. 1) exchanges fax data with the public network. A memory (ROM) 605 stores a control program which is executed by a central processing unit (CPU) 604 controlling the entire engine system controller 302.

A random access memory (RAM) 606 is used for storing information necessary in the execution of the control program stored in the ROM 605, such as the print data or the print command transmitted from the printer controller 301 or the copy controller 306, or used as a transmission/reception area for the fax data.

In the RAM 606, there is also secured an area for storing the status of the printing apparatus, as will be shown later in FIG. 7. An output buffer register 607 converts the print data in the RAM 606 into an image signal VDO.

A synchronization clock generator 608 generates an image clock signal VCLK synchronized with a BD signal. An interface circuit 609 functions as an input/output unit for the printer engine system 305.

Figure 7:
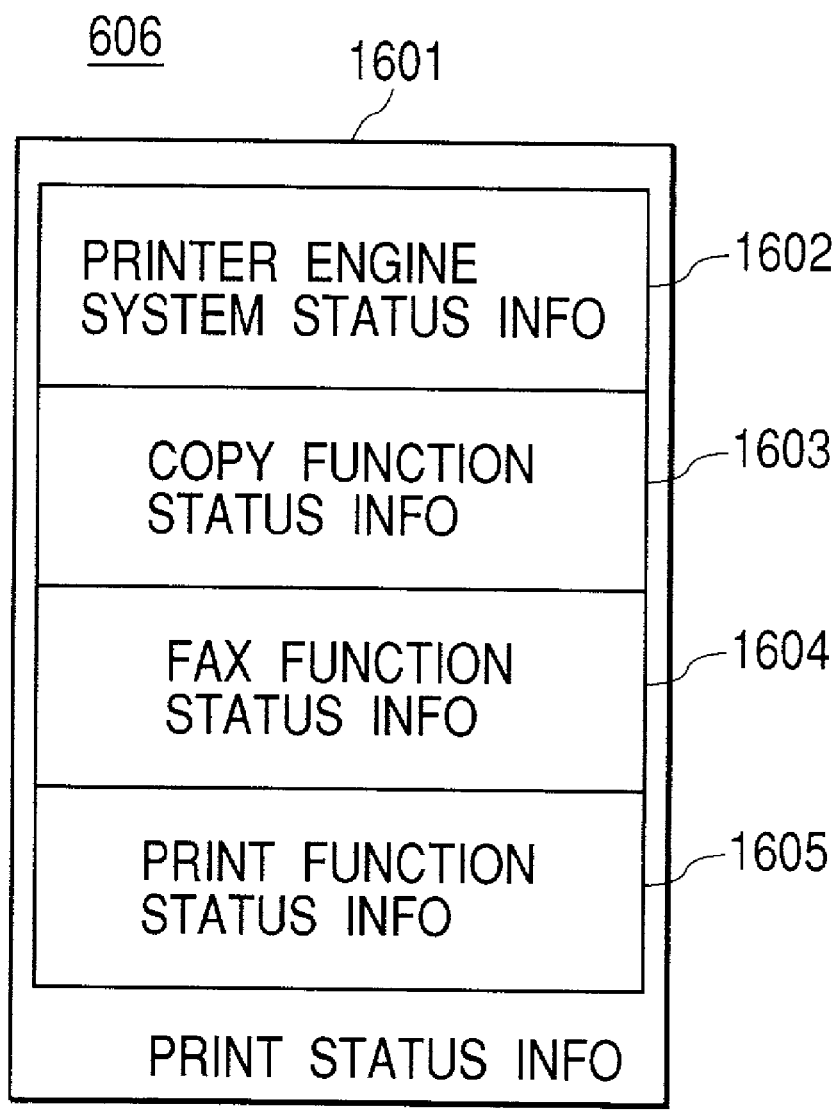
FIG. 7 is a view showing an example of print state information transmitted from the printing apparatus to the host computer.

FIG. 7 shows the print status information transmitted from the printing apparatus 101 shown in FIG. 1 to the host computer 102.

Referring to FIG. 7, print status information 1601 is composed of printer engine system status information 1602 representing the status (normal, absence of print sheet, sheet jamming etc.) of the printer engine system 305, copy function status information 1603 representing the status of the copy controller 306, fax function status information 1604 representing the status (transmission, reception, printing etc.) of the fax function, and print function status information 1605 representing the status (idle, printing etc.) of the printer controller 301.

Figure 8:
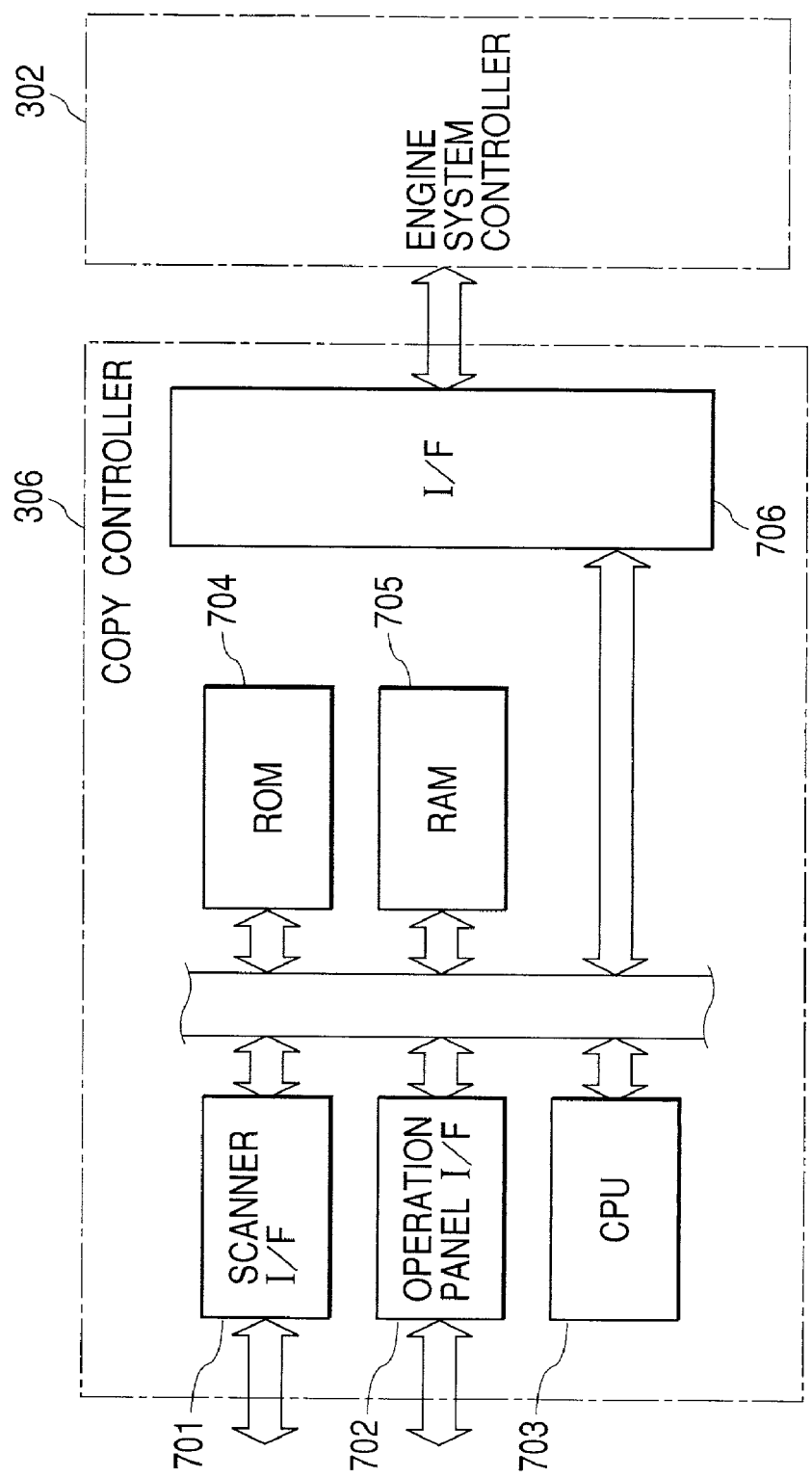
FIG. 8 is a block diagram showing the detailed configuration of a copy controller.

FIG. 8 is a block diagram showing the detailed configuration of the copy controller 306 shown in FIG. 3, wherein components same as those in FIG. 3 are represented by same numbers.

Referring to FIG. 8, a scanner interface circuit 701 functions as an input/output unit for the scanner 307. An operation panel interface circuit 702 functions as an input/output unit for the operation panel 308.

A central processing unit (CPU) 703 controls the entire copy controller 306. A memory (ROM) 704 stores a control program to be executed by the CPU 703.

A random access memory (RAM) 705 stores information necessary in the execution of the control program stored in the ROM 704, such as the print command transmitted from the operation panel 308 or the print status information transmitted from the engine system controller 302. An interface circuit 706 functions as an input/output unit for the engine system controller 302.

Figure 9:
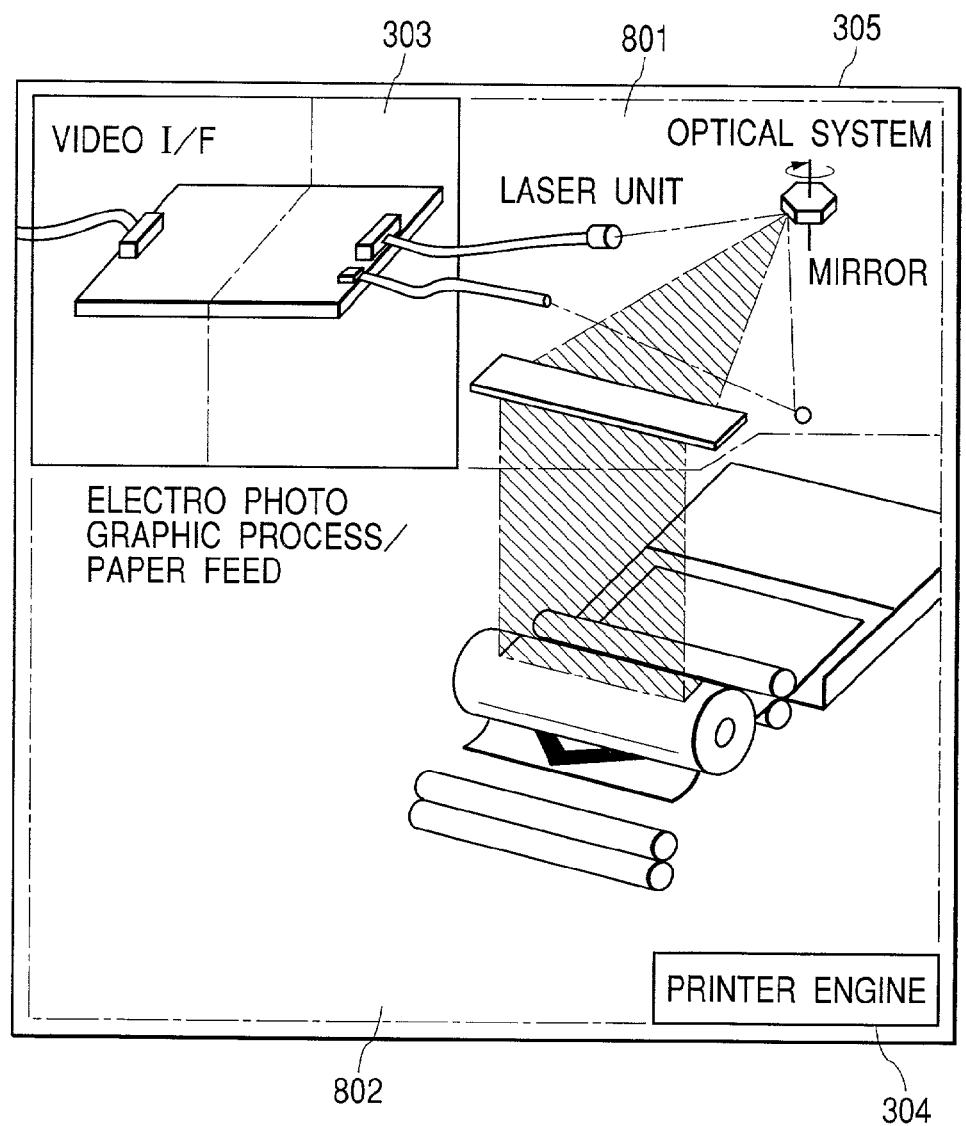
FIG. 9 is a block diagram showing the detailed configuration of a printer engine and an engine controller.

In the following there will be explained an example of the print process in a laser beam printer as an example of the printer engine system 305. FIG. 9 is a view showing the detailed configuration of the printer engine system 305 and the engine controller 303 shown in FIG. 3, corresponding to a laser beam printer utilizing a laser as the light emitting element for executing the electrophotographic process, wherein components same as those in FIG. 3 are represented by same numbers.

Referring to FIG. 9, there are shown a printer engine 304 for executing printing on a photosensitive drum based on the video signal transmitted from a engine system controller 302, and an engine controller 303 for controlling the entire printer engine system 305.

The engine controller 303 receives the video signal from the engine system controller 302 and receives the control command converted from the print command by the engine system controller 302. The engine controller 303 is composed of a portion for transmitting the status of the printer engine 304 to the engine system controller 302, and a portion for controlling the electrophotographic process, a sheet conveying system and an optical system.

An optical system 801 in the printer engine 304 focuses a laser beam, emitted from a laser unit and on/off modulated according to the image signal, onto a photosensitive drum through a polygon mirror rotated at a high speed by an unrepresented scanner motor and an optical path deflecting mirror. A sheet conveying system 802 includes a sheet feeding roller, sheet conveying rollers etc. rotated by an unrepresented motor, for conveying a recording sheet contained in a sheet containing unit, whereby a toner image developed by the electrophotographic process on the photosensitive drum is transferred onto such print sheet.

Figure 10:
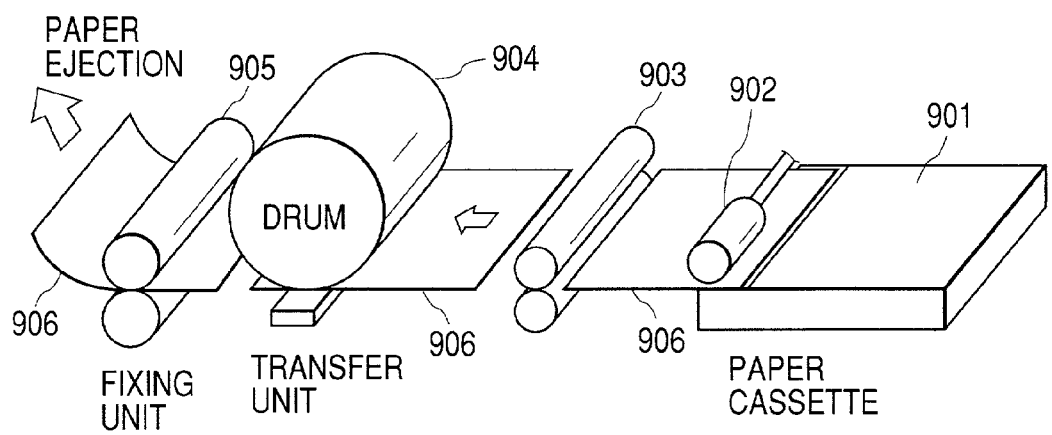
FIG. 10 is a perspective view showing an example of an electrophotographic process by the printer engine.

FIG. 10 is a perspective view showing an example of the electrophotographic process to be executed by the printer engine 304 shown in FIG. 9.

Referring to FIG. 10, a sheet cassette 901 contains print sheets of a predetermined size. It is assumed that plural sheet cassettes containing print sheets of respectively different sizes are mounted and that the size of the print sheets in each cassette and the presence or absence of the sheet therein are detected by unrepresented sensors and are informed as one of the printer engine status information to the engine system controller 104.

A sheet feeding roller 902 picks up a sheet from the sheet cassette 901 and feeds the sheet 906 in a direction indicated by an arrow (sheet conveying direction in the sheet conveying system). A sheet conveying roller 903 may also serve for registration with the leading end of the image formed on a photosensitive drum 904.

A photosensitive drum 904 is used for forming an electrostatic latent image by the optical system 801 shown in FIG. 9. The latent image is developed into a monochromatic or full-color toner image by an unrepresented developing unit. A fixing unit 905 is heated to a predetermined temperature by an unrepresented heater, and is used to apply heat and pressure to the sheet 906 bearing the transferred toner image, thereby fixing the toner image to the sheet 906. Thereafter the sheet is discharged from the apparatus.

Figure 11:
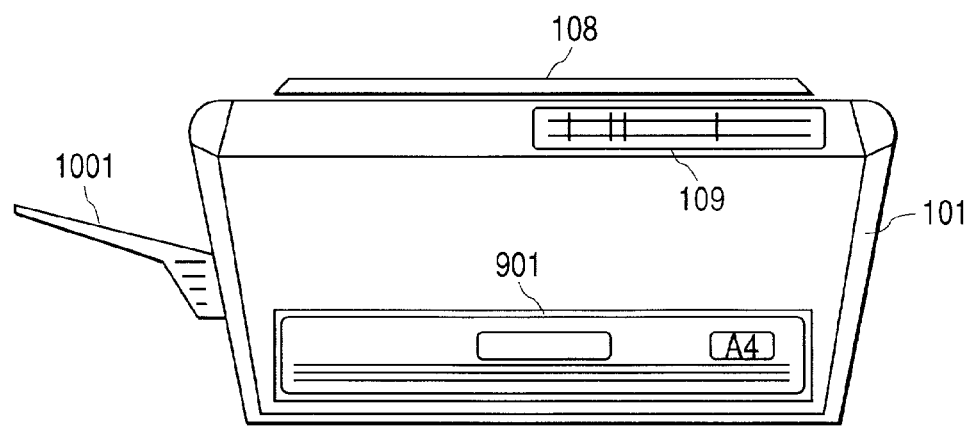
FIG. 11 is an external view of the printing apparatus.

FIG. 11 shows the external view of the printing apparatus shown in FIGS. 9 and 10, wherein components same as those in FIGS. 1 and 10 are represented by same numbers.

In FIG. 11, a sheet discharge tray 1001 is used for stacking the recording sheets discharged after passing the fixing unit 905 shown in FIG. 10. In case the printing apparatus has a two-side printing mechanism, the recording sheet is guided again to the position of the sheet conveying roller 903 by reversing the rotating direction of an represented discharge roller or by a two-side unit to be optionally connected.

FIGS. 12 to 16 are views showing display images indicating the status of the multifunction printer, to be displayed on the display unit of the host computer 102 shown in FIG. 1. The display images indicate that the user is executing a certain copying process.

Figure 12:
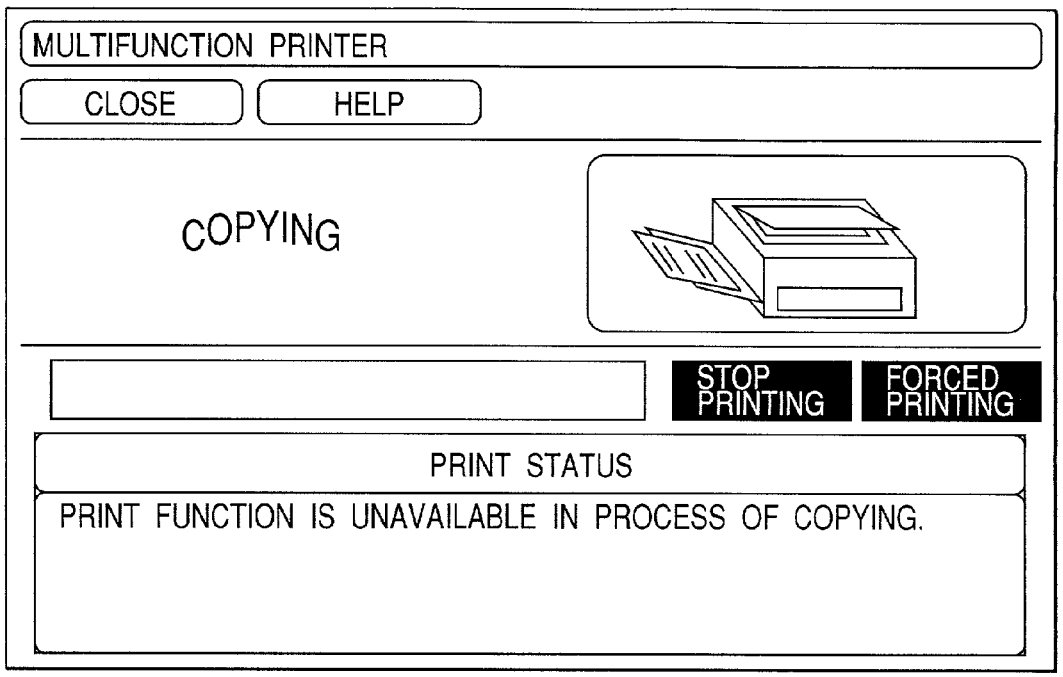
FIGS. 12, 13, 14, 15 and 16 are views showing examples of a display image showing the state of the multifunction printer, displayed o the display device of the host computer.

FIG. 12 shows a status display image, to be displayed in the course of execution of copy function, and indicating that a print output from the host computer 102 and a simultaneous reception process of fax data.

Figure 13:
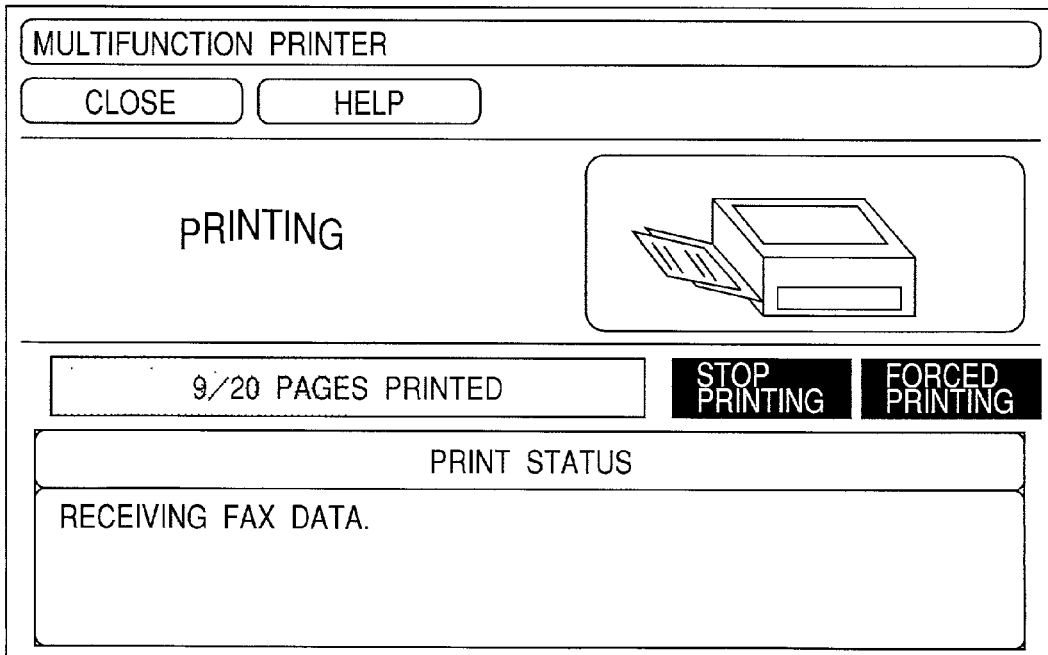

FIG. 13 shows a status display image, to be displayed in the course of execution of print function, and indicating a state of receiving fax data while executing the print function.

Figure 14:
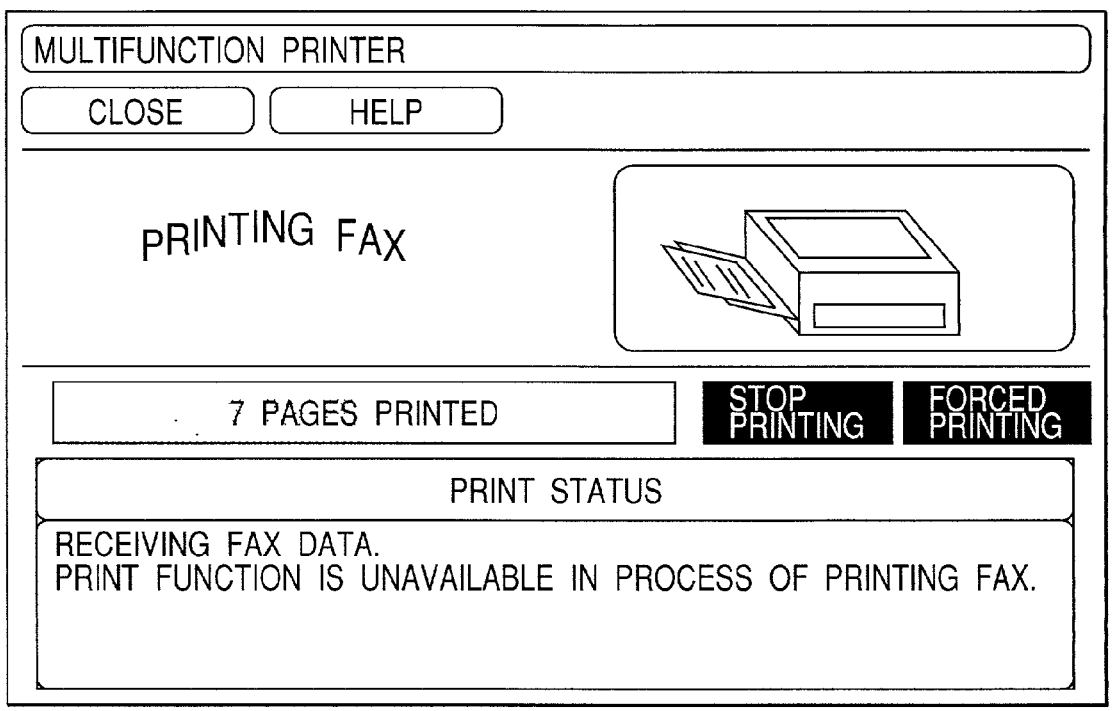

FIG. 14 shows a status display image, to be displayed in the course of execution of a printing operation by the fax function, and indicating a state of printing fax data while receiving the fax data.

Figure 15:
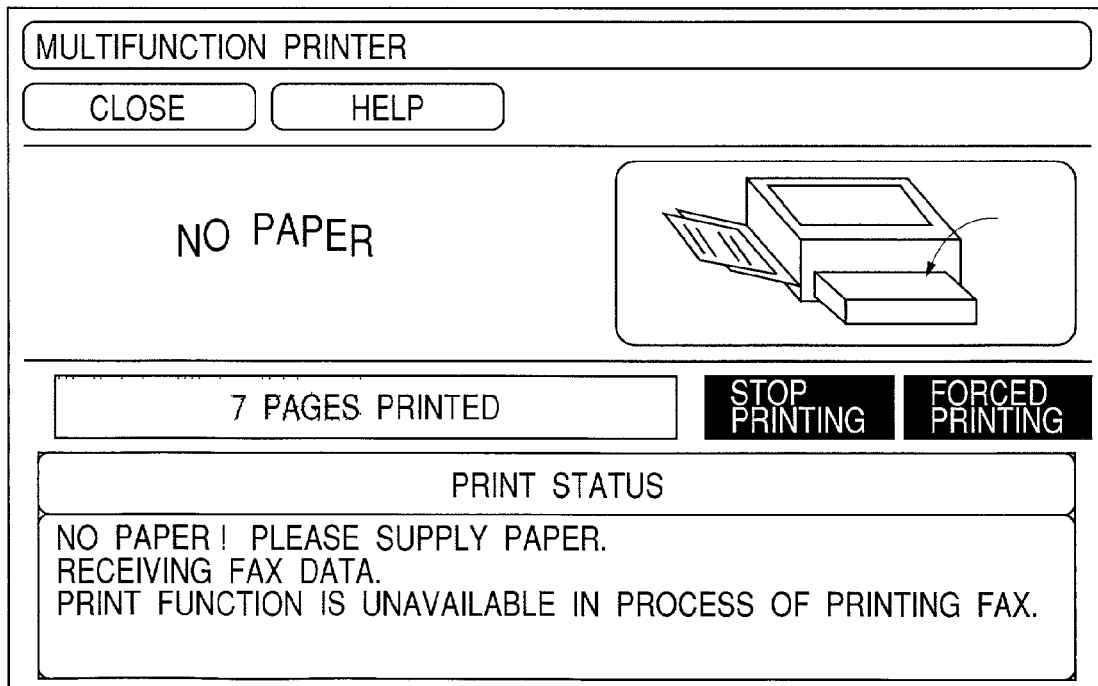
Figure 16:
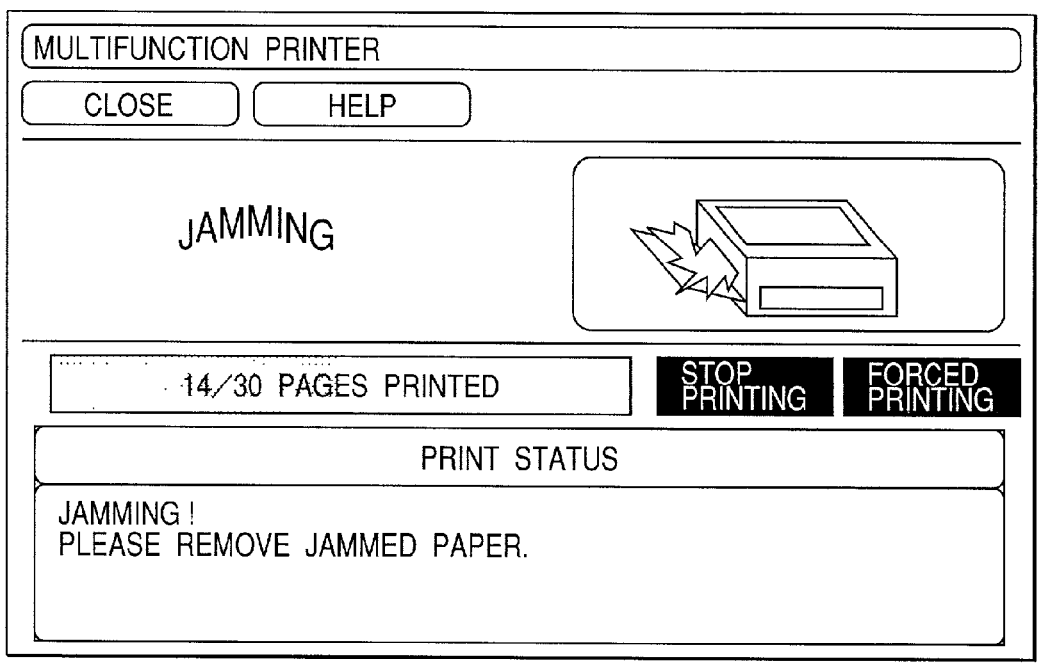

FIG. 15 shows a status display image, to be displayed in case of detection of absence of sheet in the printer engine, and FIG. 16 shows a status display image, to be displayed in case of detection of a sheet jamming in the printer engine.

In the present embodiment, as shown in FIGS. 12 to 16, there is displayed a message specific to each status and a graphic pattern for specifying the location of such status. In the present embodiment, the status of the multifunction printer is displayed in a single image by graphics, texts and animation (moving display of characters etc. for specifying the location of sheet jam etc.), and status information of high priority is displayed in an emphasized manner, for example in a curved layout shown in an upper left area of the image.

Figure 25:
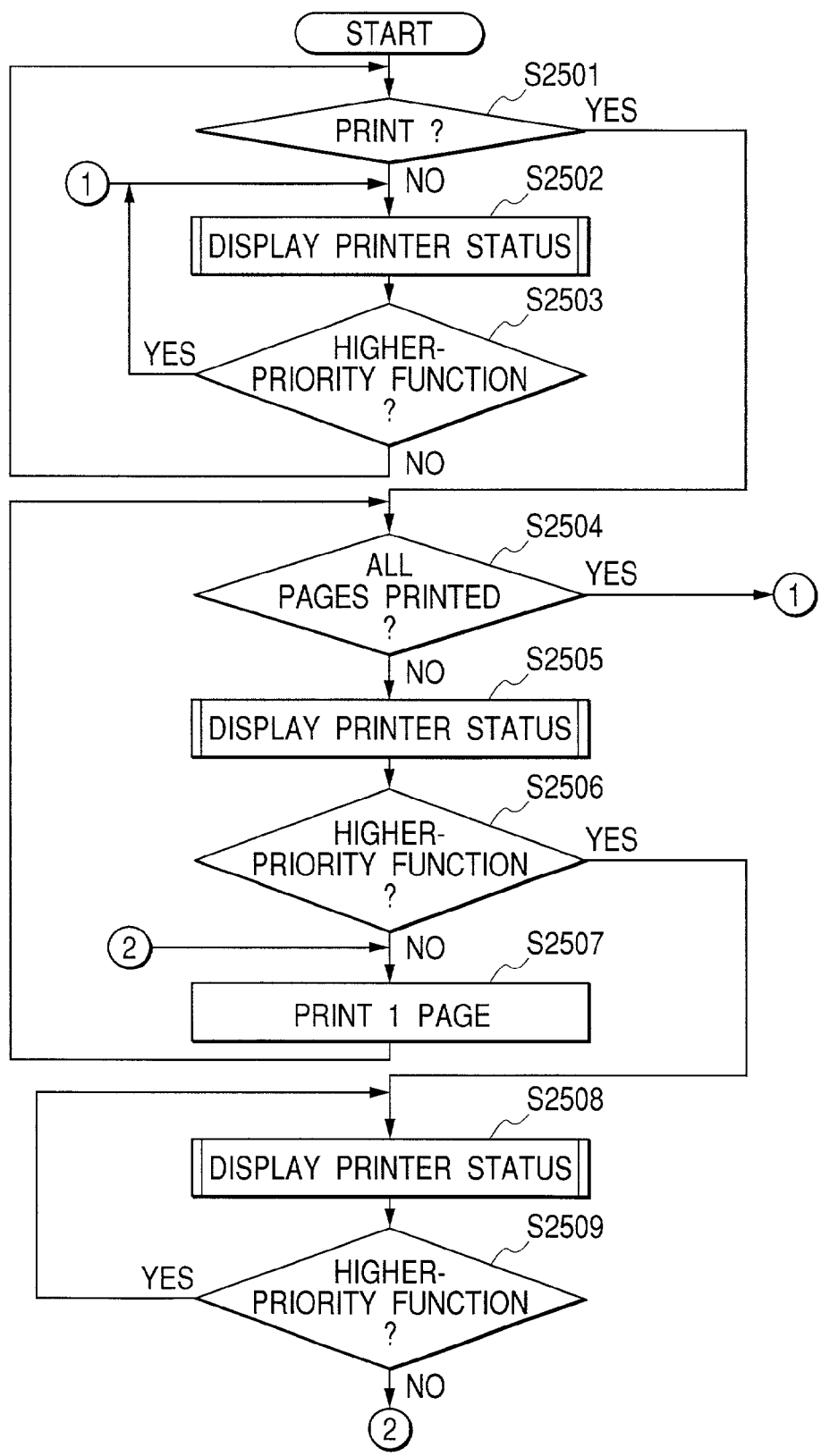
FIG. 25 is a flow chart showing an example of the data processing sequence to be executedc by the host computer.

FIG. 25 is a flow chart showing a process of the host computer 102 for transferring the print data to the printing apparatus 101 and displaying the status thereof. The control program for such process is executed by the CPU of the host computer 102, and this process is started when the host computer 102 and the printing apparatus 101 are powered and reach a state capable of the printing operation.

At first the host computer 102 discriminates whether a command for printing has been issued by the user in order to use the print function of the printing apparatus 101 (S2501), and, if issued, the sequence proceeds to a step S2504.

Figure 17:
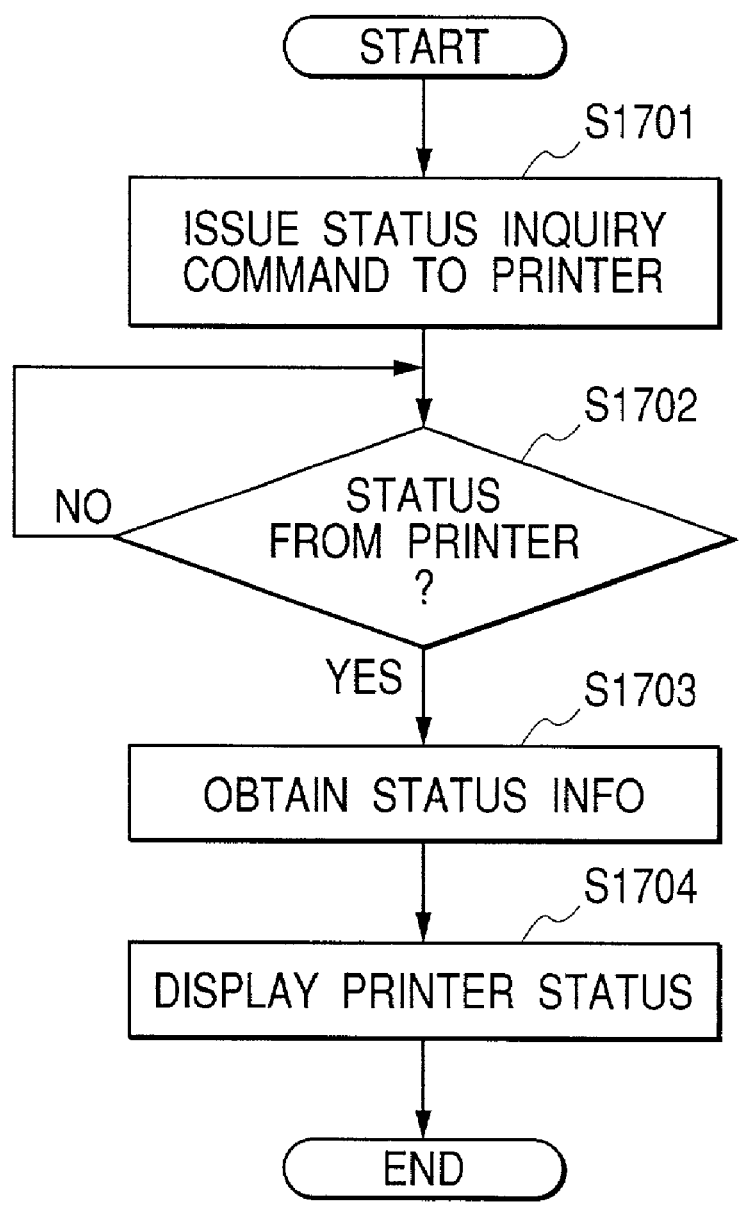
FIG. 17 is a flow chart showing an example of the data processing sequence to be executedc by the host computer.

If no printing command has been issued, a status displaying process shown in FIG. 17 is executed to display the current status of the printing apparatus 101 on the display unit of the host computer 102 (S2502). Then there is discriminated whether the printer engine system 103 of the printing apparatus is occupied by a function of a higher priority than that of the print function (S2503), and, if occupied, the sequence proceeds to a step S2502 as the print function cannot be executed. If not occupied, the sequence returns to the step S2501 in order to check again whether a print command is given.

In case a print command is given (YES in S2501), there is discriminated whether all the pages of a document have been printed in response to such print command (S2504), for example by discriminating whether the print data of all the pages of the document have been transferred to the printing apparatus 101.

If all the pages have been printed, the sequence returns to S2501 in order to check whether a next print command is given.

On the other hand, if there remains any page of which print data are not yet transferred to the printing apparatus 101, there is executed the status display process shown in FIG. 17 to check the current status of the printing apparatus and to cause the display unit of the host computer 102 to display the status of the printing apparatus (S2505).

Then there is discriminated whether the printer engine system 103 of the printing apparatus 101 is occupied by a function of a higher priority than that of the print function (S2506), and, if not occupied, the print data of a page are transferred to the printing apparatus 101 for print output process of such page (S2507).

If the printer engine system 103 is occupied by a function of a higher priority, the sequence proceeds to a step S2508 for executing again the status display process shown in FIG. 17 to check the current status of the printing apparatus. If the printer engine system 103 is occupied by a function of a higher than that of the print function (YES in S2509), the sequence returns to the step S2508.

If the printer engine system 103 is released from such function of higher priority (NO in S2509), the sequence proceeds to a step S2507 to transfer the print data of a page to the printing apparatus 101 thereby executing the print output process of such page S2507).

In this manner, in case the printer engine system 103 is used by a function hiher in priority than the print function, such as the fax function or copy function, the host computer displays such status on the display unit and interrupts the transfer of the print data to the printing apparatus. Then, in response to the acquisition of the printer engine system 103 by the print function, the print data of a page are transferred to the printing apparatus to execute the print function.

It is therefore possible to control the print output even in case the printing apparatus 101 is not provided with a memory capable of holding a large amount of print data, by transferring the print data in the unit of a page from the host computer, and to properly execute the print output by interrupting the transfer of the print data in case the printer engine system 103 of the printing apparatus 101 is occupied by another function.

FIG. 17 is a flow chart showing a process of the host computer 102 for acquiring and displaying the status of the printing apparatus. The control program of this process is executed by the CPU of the host computer 102, wherein S1701 to S1704 indicate process steps.

At first, the print command generator 204 of the host computer 102 transmits, to the printer controller 301 of the printing apparatus 101, a status inquiry command for acquiring the status information thereof (S1701). This command corresponds to a print status information acquiring command.

Then the print environment detector 205 of the host computer 102 awaits the transmission of the status information from the printer controller 301 (S1702). Then the status information returned from the printer controller 301 is fetched (S1703).

Then, based on the obtained status information of the printing apparatus 101, the window controller 206 of the host computer 102 displays the status of the printing apparatus 101 as shown in any of FIG. 4 and FIGS. 12 to 16 (S1704). The display shown in FIG. 4 indicates that the printing apparatus is idle.

More specifically, the image shown in FIG. 4 is displayed in case the status information indicates that none of the functions is currently used. Also the image shown in FIG. 12 is displayed in case the status information indicates that the copy function is used.

Also in case the received status information indicates that the printing apparatus 101 has started the reception of fax data in the course of successive transmission of the print data from the host computer 102 to the printing apparatus 101, there is at first displayed an image shown in FIG. 13. Then, in response to the reception of status information indicating the acquisition of the printer engine system 103 by the fax function, there is displayed an image as shown in FIG. 14, indicating that the fax function of higher priority is executed in emphasized manner and that the print function is therefore interrupted.

A similar process is executed also in case of the copy function. If the copy function has a higher priority than that of the print function, a similar display indicating the execution of the copy function is given in the course of such copy function.

In case the status information indicates that absence of recording sheet occurs while the printer engine system 103 is occupied by the fax function, there is displayed an image as shown in FIG. 15. Also in case the status information indicates that sheet jamming occurs during the transfer of the print data to the printing apparatus 101, there is displayed an image as shown in FIG. 16.

Figure 18:
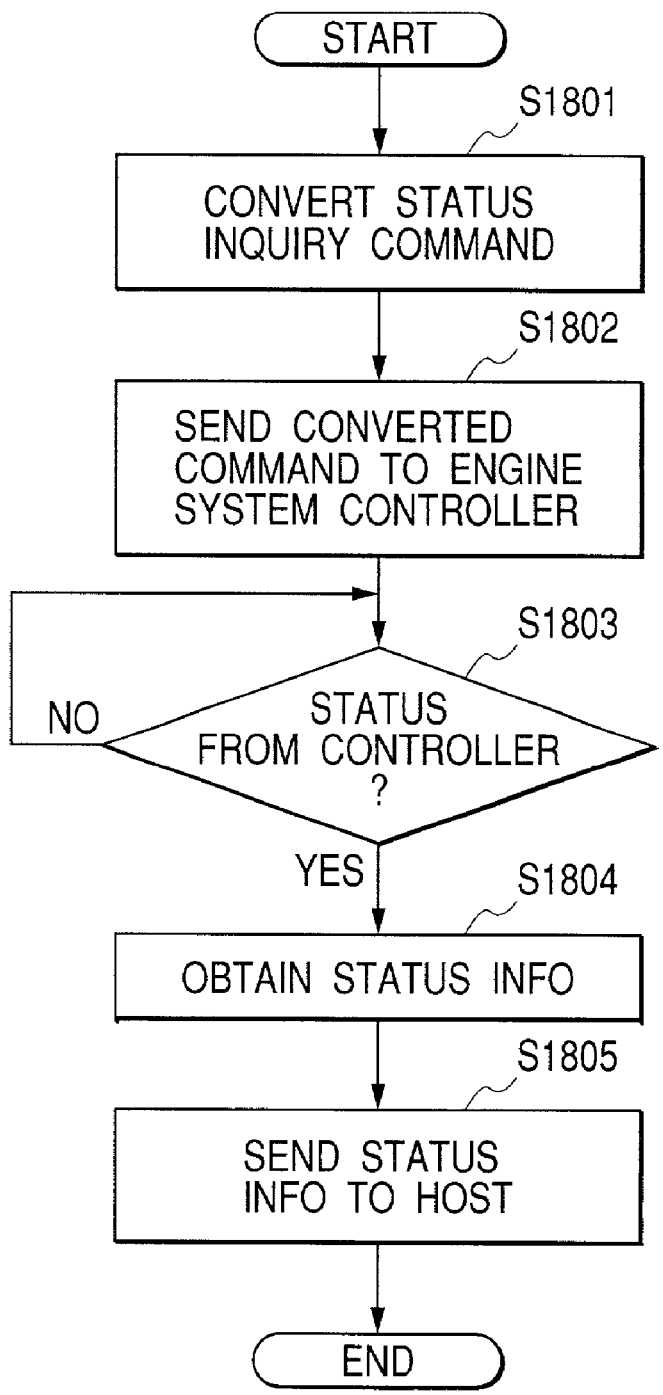
FIG. 18 is a flow chart showing an example of the data processing sequence to be executedc by the printer controller.

FIG. 18 is a flow chart showing a process of the printer controller 301 for responding to the status information inquiry command issued thereto from the host computer 102. The control program of this process is executed by the CPU 502 of the printer controller 301, wherein S1801 to S1805 indicate process steps.

At first the printer controller 301 fetches the status information inquiry command issued from the host computer 102 and converts the command so as to match the specification of the engine system controller 302 (S1801). Then the converted status information inquiry command is transmitted to the engine system controller 302 (S1802).

Then the printer controller 301 awaits the transmission of the status information from the engine system controller 302 (S1803), and fetches the status information returned from the engine system controller 302 (S1804).

Then the status information is returned to the host computer (S1805).

Figure 19:
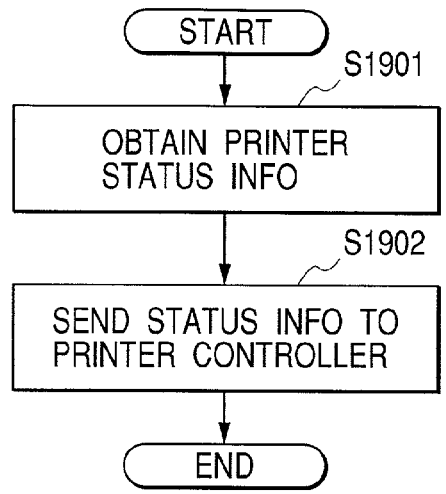
FIGS. 19 and 20 are flow chart s showing an example of the data processing sequence to be executedc by the printer engine controller.

FIG. 19 is a flow chart showing a process of the engine system controller 302 for responding to the status information inquiry command issued thereto from the printer controller 301. The control program of this process is executed by the CPU 604 of the engine system controller 302, wherein S1901 and S1902 indicate process steps.

At first the engine system controller 302 fetches the status information inquiry command issued from the printer controller 301 and extracts the status information of the printing apparatus from the print status information area 1601 shown in FIG. 7 (S1901). Then the status information is transmitted to the printer controller 301 (S1902).

Figure 20:
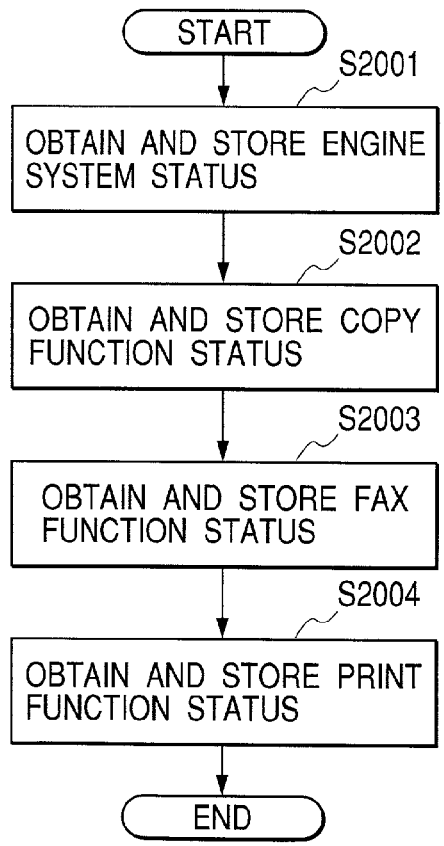

FIG. 20 is a flow chart showing a process of the engine system controller 302 for acquiring the status information of the printing apparatus at a predetermined interval. The control program of this process is executed by the CPU 604 of the engine system controller 302, wherein S2001 to S2004 indicate process steps.

At first, when the execution of this process is initiated at a predetermined interval, the engine system controller 302 obtains from the printer engine the status thereof and stores such status in the printer engine status information area 1602 shown in FIG. 7 (S2001).

Then the engine system controller 302 obtains the status of the copy function from the copy controller 306 and stores such status in the copy function status information area 1603 shown in FIG. 7 (S2002).

Then the engine system controller 302 obtains the status of the fax function and stores the status in the fax function status information area 1604 shown in FIG. 7 (S2003).

Then the engine system controller 302 obtains the status of the print function from the printer controller 301 and stores such status in the print function status information area 1605 shown in FIG. 7 (S2004).

The above-described process allows the engine system controller 302 to constantly store latest status information of the printing apparatus in the print status information 1601 shown in FIG. 7.

[Second Embodiment]

Figure 21:
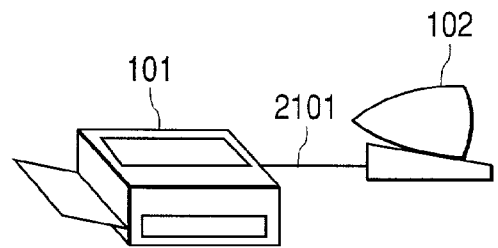
FIG. 21 is a view showing an example of a print system constituting a first embodiment.
Figure 22:
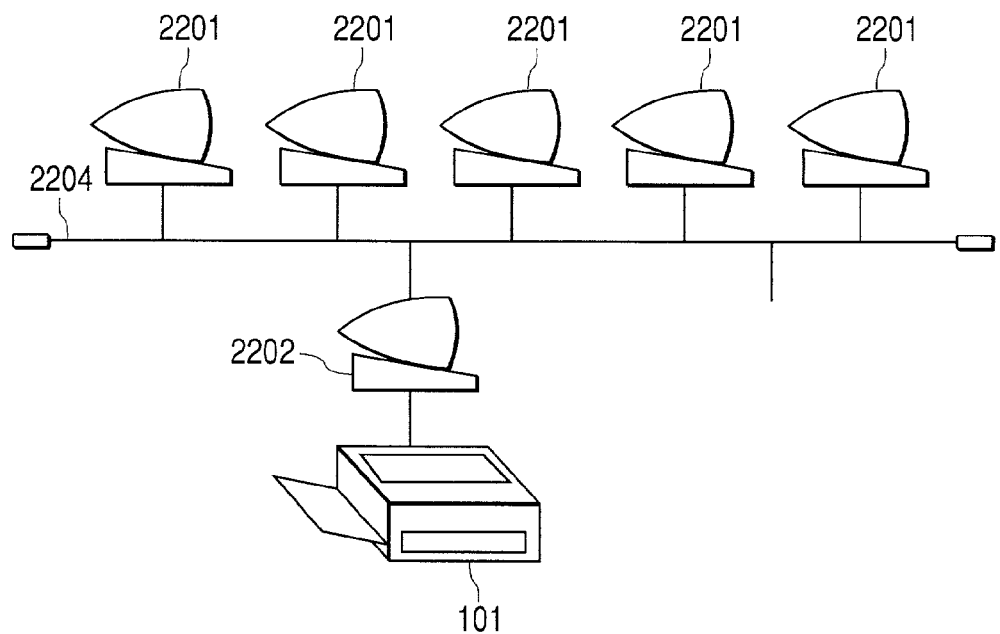
FIG. 22 is a view showing an example of a print system constituting a second embodiment.

In the foregoing first embodiment, there has been explained a configuration in which the printing apparatus 101 and the host computer 102 are directly connected by the bidirectional interface cable 2101 as shown in FIG. 21, but the present invention is effective also in a printing apparatus used in a network environment as shown in FIG. 22.

FIG. 22 illustrates an example of a print system in which an image processing apparatus and an information processing apparatus constituting a second embodiment of the present invention are applicable.

In FIG. 22, there are shown clients 2201 in the network environment and a server 2202.

There are also shown a printing apparatus 101 of the present embodiment, and a network cable 2204 used in the network environment.

In the print system of the above-described configuration, the information exchange between the server 2202 and the printing apparatus 101 in the network environment is basically same as that in the configuration of the first embodiment.

In the following there will be explained, with reference to FIG. 22, the function of the client 2201 and the server 2202 in the network environment.

In the present print system, the status information inquiry command for the printing apparatus, generally issued from the client 2201, is received by a print command generator 204 of the server 2202 through the network cable 2204.

Then, based on the information exchange between the server 2202 and the printing apparatus 101 similar to that in the first embodiment, a print environment detector 205 of the server 2202 receives from the printing apparatus 101 the status information thereof.

Then the print environment detector 205 of the server 2202 returns the status information of the printing apparatus to the client 2201 through the network cable 2204.

Then, based on the status information of the printing apparatus 101 returned from the print environment detector 205 of the server 2202, a window Ocontroller 206 in the client 2201 displays the status of the printing apparatus as shown in any of FIGS. 4 and 12 to 16, on the display unit of the client.

Though not illustrated in FIG. 22, the server 2202 is provided with a window controller, so that the status of the printing apparatus as shown in FIGS. 4, 12 to 16 can naturally be displayed on the display unit of the server 2202.

[Third Embodiment]

Figure 23:
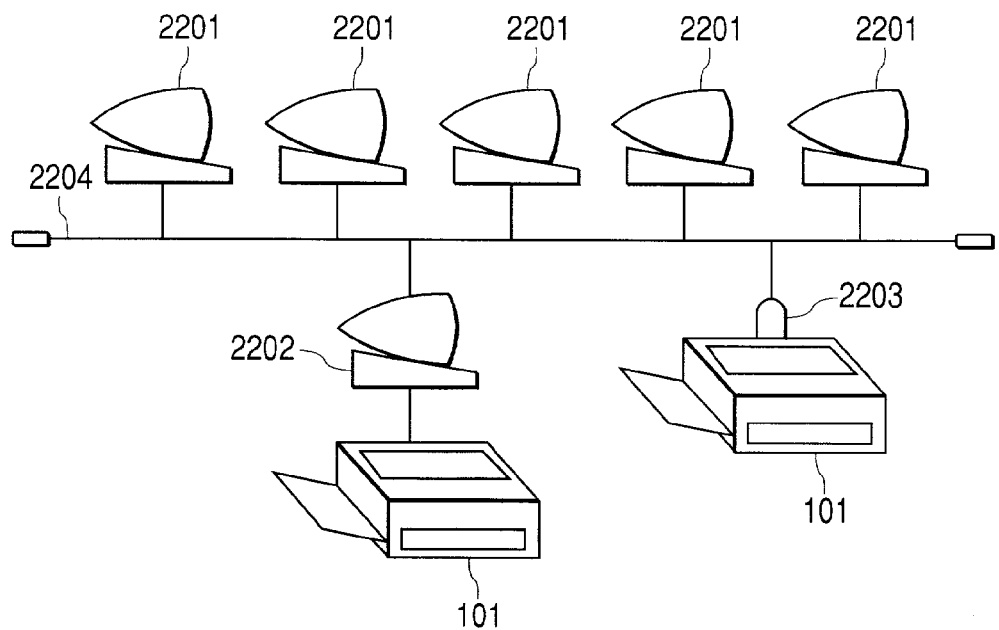
FIG. 23 is a block diagram showing the configuration of a print system constituting a third embodiment.

The present invention is also effective in another configuration of the network environment utilizing a network connector 2202 as shown in FIG. 23.

FIG. 23 is a block diagram showing the configuration of a print system in which an image processing apparatus and an information processing apparatus constituting a third embodiment of the present invention are applicable, wherein components same as those in FIG. 22 are represented by same numbers.

In FIG. 23, there are shown clients 2201 in the network environment as in the second embodiment, and a network connector 2203 for connecting the network cable 2204 with the printing apparatus 101.

The present configuration is same as that shown in FIG. 21 except that the bidirectional interface cable is replaced by the network cable 2204 and the network connector 2203 and is similar in the internal functions to the foregoing first embodiment, so that the detailed functions will not be explained further.

In the foregoing embodiments, there has been explained a laser beam printer as the printer engine, but the present invention is naturally effective also to the printing apparatuses employing an LED array or a liquid crystal shutter as the light emitting device.

Also there has been assumed a printing apparatus employing the electrophotographic process in the printer engine, but the present invention is naturally applicable to any printer (ink jet printer, serial printer etc.) capable of executing the printing process in the unit of a page regardless of the printer engine employed therein.

Also in the foregoing there has been explained a multi-function printer having the print function, copy function and fax function, but the present invention is effective also to other multifunction printers combined with any other devices.

In the following there will be explained, with reference to a memory map shown in FIG. 24, the configuration of the data processing program readable by the print system in which the image processing apparatus and the information processing apparatus of the present invention are applicable.

FIG. 24 is a memory map of a memory medium storing various data processing programs readable by the print system in which the image processing apparatus and the information processing apparatus of the present invention are applicable.

Though not illustrated, the memory medium may also store information for managing the programs stored therein, such as version information or the author thereof, and information dependent on the operating system of the program reading device such as icons for identifying the programs.

Furthermore, data belonging to such programs are managed by the above-described directory. There may further be stored a program for installing the programs into the computer and a decompressing program in case the programs to be installed are compressed.

The functions of the foregoing embodiments shown in FIGS. 17 to 20 and 25 may be realized by externally installed programs, through the execution by the host computer or the information processing apparatus as to the functions shown in FIGS. 17 and 25, and through the execution by the image processing apparatus as to the functions shown in FIGS. 18 to 20. In such configuration, the present invention is also applicable to a case where the information including the programs are supplied to the output apparatus from a memory medium such as a CD-ROM, a flush memory or an FD or from an external memory medium through the network.

The objects of the present invention can naturally be attained also by supplying a system or an apparatus with a memory medium storing program codes of a software realizing the functions of the aforementioned embodiments and reading and executing the program codes by a computer (or CPU or MPU) of such system or apparatus.

It is furthermore possible to realize the present invention by supplying the host computer with a software program (including modules) as shown in FIGS. 17 and 25 and to be activated on the host computer and a software program (including modules) as shown in FIGS. 18 to 20 and to be activated on the printing apparatus by means of a single memory medium and by installing the program to the printing apparatus from the host computer when required, or by storing such software programs for the functions to be respectivvely realized by the host computer and the printing apparatus in separate memory media and supplying such devices with the respective memory media.

In such case the program codes themselves read from the memory medium realize the novel functions of the present invention, and the memory medium itself storing the program codes constitutes the present invention.

The memory medium for supplying the program codes can be, for example, a floppy disk, a hard disk, an optical disk, a magnetooptical disk, a CD-ROM, a CD-RR, a magnetic tape, a non-volatile memory card, a ROM or an EEPROM.

The present invention includes not only a case where the functions of the aforementioned embodiments are realized by execution of the read program codes by the computer, but also a case where an operating system or the like functioning on the computer executes all the processes or a part thereof according to the instructions of the program codes thereby attaining the functions of the aforementioned embodiments.

The present invention further includes a case where the program codes read from the memory medium are once stored in a memory provided in a function expansion board inserted into the computer or a function expansion unit connected thereto and a CPU or the like provided in the function expansion board or the function expansion unit executes all the processes or a part thereof under the instructions of the program codes thereby realizing the functions of the aforementioned embodiments.

As explained in the foregoing, the present invention enables to inform the user of the function status of each image processing function operable on the image processing apparatus in response to the print request from the information processing apparatus thereby providing a display image of excellent convenience for causing the user to recognize the status of the image processing functions including the print function.

Also the present invention enables, prior to the transfer of the generated print data, to request the information indicating the latest function status of the image processing function to the image processing apparatus and to clearly show the function state of the image processing functions, including functions other than the print function,to the user when the user issues the print command, thereby enabling the user to recognize the status of the all the image processing functions in the image processing apparatus serving for the multiple functions.

Therefore, at the print command from the information processing apparatus to the image processing apparatus capable of multiple functions, the user can recognize, at the same time, the function status of all the functions realizable in such image processing apparatus and can easily understand the status of the plural functions in such image processing apparatus on real-time basis.

In particular, the user can confirm whether the printing process corresponding to the print request is currently executed or is suspended by the process of another function. Also the information processing apparatus can arbitrarily construct such operation environment.

What is claimed is:

1. A print system comprising:
an image processing apparatus for executing an image processing function selected from among a plurality of image processing functions, wherein said image processing apparatus has a print engine; and
an information processing apparatus for generating print data to be transferred to said image processing apparatus,
wherein said information processing apparatus acquires, from said image processing apparatus, information indicating a function status of the plurality of image processing functions, also executes a process of transferring the generated print data to said image processing apparatus and displays the function status of the plurality of image processing functions on a display unit based on the acquired information, and
wherein, when a predetermined print processing function included in the plurality of image processing functions obtains the print engine, said information processing apparatus displays information indicating that the predetermined print processing function is being executed and information showing that the print engine cannot be used for one of the plurality of image processing functions for the generated print data, and wherein the predetermined print processing function has higher priority than the image processing function for the generated print data and said information processing apparatus displays the function status of the predetermined print processing function in an emphasized manner.

2. A print system according to claim 1, wherein said information processing apparatus displays the function status of the plural image processing functions in a single image, based on the acquired information.

3. A print system according to claim 1, wherein said information processing apparatus is adapted to display, on the display unit, that the generated print data are being transferred to said image processing apparatus.

4. A print system according to claim 1, wherein said information processing apparatus discriminates, based on the acquired information, whether the predetermined print processing function is being executed in said image processing apparatus and, displays the function status of the predetermined print processing function in an emphasized manner if it is discriminated that the predetermined print processing is being executed.

5. A print system according to claim 4, wherein said information processing apparatus, simultaneously with the emphasized display of the function status of the image processing function of higher priority, suspends the transfer process of the print data to said image processing apparatus.

6. A print system according to claim 1, wherein said information processing apparatus acquires, from said image processing apparatus, the information indicating the function status of the plurality of image processing functions, for every transfer of the print data of a page.

7. A print system according to claim 1, wherein said image processing apparatus acquires information indicating the function status of the plurality of image processing functions, manages the acquired information in unified manner in a storage unit, and renews the information stored in said storage unit in response to a change in the function status.

8. A print system according to claim 7, wherein said image processing apparatus transmits the information stored in said storage unit to said information processing apparatus, in response to a print request from said information processing apparatus or to a request from said information processing apparatus for acquiring the information indicating the function status.

9. A print system according to claim 1, wherein said image processing functions include a print function for executing printing based on data from said information processing apparatus, a copy function and a facsimile function.

10. A print system according to claim 1, wherein said image processing apparatus comprises a print unit for executing printing, and said print is used by one of the plural image processing functions.

11. An information processing apparatus for transferring print data by communication with an image processing apparatus for executing an image processing function selected from among a plurality of image processing functions, the image processing apparatus having a print engine, said information processing apparatus comprising:
generation means for generating print data to be transferred to the image processing apparatus;
acquisition means for acquiring, from the image processing apparatus, information indicating a function status of the plurality of image processing functions; and
control means for controlling a process of transferring the print data generated by said generation means to the image processing apparatus and controlling a display for displaying the function status of the plurality of image processing functions on a display unit based on the information acquired by said acquisition means,
wherein, when a predetermined print processing function included in the plurality of image processing functions obtains the print engine, said information processing apparatus displays information indicating that the predetermined print processing function is being executed and information showing that the print engine cannot be used for one of the plurality of image processing functions for the generated print data, and wherein the predetermined print processing function has higher priority than the image processing function of the generated print data and said information processing apparatus displays the function status of the predetermined print processing function in an emphasized manner.

12. An information processing apparatus according to claim 11, wherein said display control means is capable, based on the information acquired by said acquisition means, of displaying the function status of the plural image processing functions on a single image by graphics, text and animation.

13. An information processing apparatus according to claim 11, wherein said display control means discriminates, based on the information acquired by said acquisition means, whether an image processing function of higher priority is executed in said image processing apparatus, and, in case of discrimination that a processing function of higher priority is executed, displays the function status of the image processing function of such high priority in an emphasized manner.

14. An information processing apparatus according to claim 11, wherein said display control means displays a text indicating the function status of the image processing function of higher priority in an emphasized manner by a layout in a predetermined area of the display unit.

15. An information processing apparatus according to claim 11, wherein said image processing functions include a print function for executing printing based on data from the information processing apparatus, a copy function and a facsimile function.

16. A status display method for an information processing apparatus for transferring print data by communication with an image processing apparatus for executing an image processing function selected from among a plurality of image processing functions, the image processing apparatus having a print engine, the method comprising steps of
  acquiring, from said image processing apparatus, information indicating a function status of the plurality of image processing functions; and
  executing a process of transferring the generated print data to said image processing apparatus and displaying the function status of the plurality of image processing functions on a display unit based on the acquired information,
  wherein, when a predetermined print processing function included in the plurality of image processing functions obtains the print engine, said information processing apparatus displays information indicating that the predetermined print processing function is being executed and information showing that the print engine cannot be used for one of the plurality of image processing functions for the generated print data, and wherein the predetermined print processing function has higher priority than the image processing function for the generated print data and said information processing apparatus displays the function status of the predetermined print processing function in an emphasized manner.

17. A status display method according to claim 16, wherein the function status of the plurality of image processing functions can be displayed, based on the acquired information, on a single image by graphics, text and animation.

18. A status display method according to claim 16, further comprising discriminating, based on the acquired information, whether an image processing function of higher priority is executed in said image processing apparatus, and, in case of discrimination that a processing function of higher priority is executed, displaying the function status of the image processing function of such high priority in an emphasized manner.

19. A status display method according to claim 16, wherein a text indicating the function status of the image processing function of higher priority is displayed in an emphasized manner by a layout in a predetermined area of the display unit.

20. A status display method according to claim 16, wherein said image processing functions include a print function for executing printing based on data from the information processing apparatus, a copy function and a facsimile function.

21. A program stored on a computer-readable medium for controlling an information processing apparatus for transferring print data by communication with an image processing apparatus for executing an image processing function selected from among a plurality of image processing functions, the image processing apparatus having a print engine, the program comprising:
  a generation step of generating the print data to be transferred to said image processing apparatus;
  an acquisition step of acquiring, from the image processing apparatus, information indicating a function status of the plurality of image processing functions; and
  a control step of controlling a process of transferring the print data generated by said generation step to the image processing apparatus and displaying the function status of the plurality of image processing functions on a display unit based on the information acquired by said acquisition step,
  wherein, when a predetermined print processing function included in the plurality of image processing functions obtains the print engine, said information processing apparatus displays information indicating that the predetermined print processing function is being executed and information showing that the print engine cannot be used for one of the plurality of image processing functions for the generated print data, and wherein the predetermined print processing function has higher priority than the image processing function for the generated print data and said information processing apparatus displays the function status of the predetermined print processing function in an emphasized manner.

22. A program stored on a computer-readable medium according to claim 21, wherein the function status of the plural image processing functions can be displayed, based on the information acquired by the acquisition step, on a single image by graphics, text and animation.

23. A program stored on a computer-readable medium according to claim 21, wherein said display control step discriminates, based on the information acquired in said acquisition step, whether an image processing function of higher priority is executed in said image processing apparatus, and, in case of discrimination that a processing function of higher priority is executed, displays the function status of the image processing function of such high priority in an emphasized manner.

24. A program stored on a computer-readable medium according to claim 21, wherein said display control step displays a text indicating the function status of the image processing function of higher priority in an emphasized manner by a layout in a predetermined area of the display unit.

25. A program stored on a computer-readable medium according to claim 21, wherein said image processing functions include a print function for executing printing based on data from the information processing apparatus, a copy function and a facsimile function.

26. A computer readable memory medium storing a program for controlling an information processing apparatus for transferring print data by communication with an image processing apparatus for executing an image processing function selected from among a plurality of image processing functions, the image processing apparatus having a print engine, said program comprising:
  a generation step of generating the print data to be transferred to said image processing apparatus;
  an acquisition step of acquiring, from the image processing apparatus, information indicating a function status of the plurality of image processing functions; and
  a control step of controlling a process of transferring the print data generated by said generation step to the image processing apparatus and controlling a display for the function status of the plurality of image processing functions on a display unit based on the information acquired by said acquisition step,
  wherein, when a predetermined print processing function included in the plurality of image processing functions obtains the print engine, said information processing apparatus displays information indicating that the predetermined print processing function is being executed and information showing that the print engine cannot be used for one of the plurality of image processing functions for the generated print data, and wherein the predetermined print processing function has higher priority than the image processing function for the generated print data and said information processing apparatus displays the function status of the predetermined print processing function in an emphasized manner.

27. A memory medium according to claim 26, wherein said display control step can display the function status of the plurality of image processing functions, based on the information acquired by the acquisition step, on a single image by graphics, text and animation.

28. A memory medium according to claim 26, wherein said display control step discriminates, based on the information acquired in said acquisition step, whether an image processing function of higher priority is executed in said image processing apparatus, and, in case of discrimination that a processing function of higher priority is executed, displays the function status of the image processing function of such high priority in an emphasized manner.

29. A memory medium according to claim 26, wherein said display control step displays a text indicating the function status of the image processing function of higher priority in an emphasized manner by a layout in a predetermined area of the display unit.

30. A memory medium according to claim 26, wherein said image processing functions include a print function for executing printing based on data from the information processing apparatus, a copy function and a facsimile function.

31. An information processing apparatus for transferring print data by communication with an image processing apparatus for executing an image processing function selected from among a plurality of image processing functions, the image processing apparatus having a print engine that can be used by the plurality of image processing functions for printing data on a recording medium, said information processing apparatus comprising:

control means for controlling a process of transferring the print data to the image processing apparatus and controlling a display for displaying the function status of the plurality of image processing functions on a display unit, wherein, when in place of one of the plurality of image processing functions another one of the plurality of image processing functions obtains the print engine, said information processing apparatus displays on the display unit information indicating that the one image processing function cannot be executed, and wherein the other image processing function has higher priority than the one image processing function and said information processing apparatus displays the function status of the other image processing function in an emphasized manner.

32. An information processing apparatus according to claim 31, wherein the one image processing function is a function for printing data received from said information processing apparatus, and the another image processing function is a copy function or a facsimile function, wherein the copy function or facsimile function obtains the currently used print function by an interrupt process, and wherein the information indicates that the function for printing data from said information processing apparatus cannot be executed.

33. An information processing apparatus according to claim 31, wherein in the event that while one of the plurality of image processing functions uses the print function, another one of the plurality of image processing functions obtains the currently used print function, said control means controls the display unit to display information indicating the another image processing function.

34. A method of operating an information processing apparatus for transferring print data by communication with an image processing apparatus for executing an image processing engine selected from among a plurality of image processing functions, the image processing apparatus having a print function that can be used by the plurality of image processing functions for printing data on a recording medium, said method comprising:

controlling a process of transferring the print data to the image processing apparatus and controlling a display for displaying the function status of the plurality of image processing functions on a display unit, wherein, when in place of one of the plurality of image processing functions another one of the plurality of image processing functions obtains the print engine, said information processing apparatus displays on the display unit information indicating that the one image processing function cannot be executed, and wherein the other image processing function has higher priority than the one image processing function and said information processing apparatus displays the function status of the other image processing function in an emphasized manner.

35. A computer-readable medium storing a program for operating an information processing apparatus for transferring print data by communication with an image processing apparatus for executing an image processing function selected from among a plurality of image processing functions, the image processing apparatus having a print engine that can be used by the plurality of image processing functions for printing data on a recording medium, said program comprising:

controlling a process of transferring print data to the image processing apparatus and controlling a display for displaying the function status of the plurality of image processing functions on a display unit, wherein, when in place of one of the plurality of image processing functions another one of the plurality of image processing functions obtains the print engine, said information processing apparatus displays on the display unit information indicating that the one image processing function cannot be executed, and wherein the other image processing function has higher priority than the one image processing function and said information processing apparatus displays the function status of the other image processing function in an emphasized manner.

* * * * *

UNITED STATES PATENT AND TRADEMARK OFFICE
CERTIFICATE OF CORRECTION

PATENT NO.       : 7,180,612 B2
APPLICATION NO.  : 09/922646
DATED            : February 20, 2007
INVENTOR(S)      : Shimizu It is certified that error appears in the above-identified patent and that said Letters Patent is hereby corrected as shown below:

COVER SHEET:
(56) Foreign Patent Documents, "JP  10-124442    1/1989" should read
-- JP  10-124442         5/1989 --; and
(57) Abstract, "functcion" should read -- function --.

COLUMN 2:
Line 42, "o" should read -- on --;
Line 44, "executedc" should read -- executed --;
Line 46, "executedc" should read -- executed --;
Line 48, "chart s" should read -- charts --;
Line 49, "executedc" should read -- executed --; and
Line 60, "executedc" should read -- executed --.

COLUMN 3:
Line 15, "trays" should read -- tray --;
Line 18, "controlls" should read -- controls --;
Line 31, "therough" should read -- through --; and
Line 59, "originla" should read -- original --.

COLUMN 4:
Line 41, "palling" should read -- polling --; and
Line 66, "dispolay" should read -- display --.

COLUMN 6:
Line 48, "in" should read -- is in --.

COLUMN 9:
Line 1, "represented" should read -- unrepresented --.

COLUMN 10:
Line 14, "higher" should read -- higher priority --;
Line 20, "S2507)." should read -- (S2507). --; and
Line 22, "hiher" should read -- higher --.

COLUMN 12:
Line 49, "Ocontroller" should read -- controller --.

COLUMN 14:
Line 10, "respectively" should read -- respectively --.

UNITED STATES PATENT AND TRADEMARK OFFICE
CERTIFICATE OF CORRECTION

PATENT NO. : 7,180,612 B2
APPLICATION NO. : 09/922646
DATED : February 20, 2007
INVENTOR(S) : Shimizu It is certified that error appears in the above-identified patent and that said Letters Patent is hereby corrected as shown below:

COLUMN 15:
Line 44, "and," should read -- and --.

COLUMN 16:
Line 10, "said print" should read -- said print unit --.

COLUMN 17:
Line 7, "of" should read -- of: --.

COLUMN 18:
Line 13, "thanthe" should read -- than the --; and
Line 42, "computer readable," should read -- computer-readable --.

COLUMN 20:
Line 43, "print" should read -- the print --.

Signed and Sealed this

Twenty-fifth Day of March, 2008

JON W. DUDAS
*Director of the United States Patent and Trademark Office*